(12) United States Patent
Panarella

(10) Patent No.: US 10,079,075 B2
(45) Date of Patent: Sep. 18, 2018

(54) NUCLEAR FUSION SYSTEM THAT CAPTURES AND USES WASTE HEAT TO INCREASE SYSTEM EFFICIENCY

(75) Inventor: Emilio Panarella, Ottawa (CA)

(73) Assignee: Emilio Panarella, Ottawa (CA)

( * ) Notice: Subject to any disclaimer, the term of this patent is extended or adjusted under 35 U.S.C. 154(b) by 0 days.

(21) Appl. No.: 10/094,354

(22) Filed: Mar. 8, 2002

(65) Prior Publication Data

US 2003/0002610 A1    Jan. 2, 2003

Related U.S. Application Data

(60) Provisional application No. 60/274,211, filed on Mar. 9, 2001.

(51) Int. Cl.
  *G21B 1/00*   (2006.01)
  *G21B 1/21*   (2006.01)

(52) U.S. Cl.
  CPC .................. *G21B 1/00* (2013.01); *G21B 1/21* (2013.01); *Y02E 30/10* (2013.01)

(58) Field of Classification Search
  CPC .................................... G21B 1/00; G21B 1/21
  USPC ....... 376/145, 146, 150, 115, 119, 128, 320; 237/12.1; 123/41.14; 60/644.1; 315/111.21; 290/2, 24
  See application file for complete search history.

(56) References Cited

U.S. PATENT DOCUMENTS

| | | | | |
|---|---|---|---|---|
| 3,624,239 A | * | 11/1971 | Fraas ....................... | G21B 1/03 376/146 |
| 3,769,770 A | * | 11/1973 | Deschamps ............. | E04B 31/76 428/403 |
| 4,158,598 A | * | 6/1979 | Baird ....................... | G21B 1/03 376/146 |
| 4,182,650 A | | 1/1980 | Fischer ............................. | 176/8 |
| 4,217,172 A | * | 8/1980 | Mori et al. ..................... | 376/146 |
| 4,333,796 A | | 6/1982 | Flynn ............................ | 376/100 |

(Continued)

FOREIGN PATENT DOCUMENTS

| | | |
|---|---|---|
| GB | 1555840 | 11/1979 |
| GB | 2234849 | 2/1991 |

OTHER PUBLICATIONS

"X-Ray Mass Attenuation Coefficients." <http://physics.nist.gov/ . . . > Downloaded Oct. 29, 2006. pp. 1-6 and 1-2.*

(Continued)

*Primary Examiner* — Jack W Keith
*Assistant Examiner* — Daniel Wasil

(57) ABSTRACT

A nuclear fusion system comprises a nuclear fusion device for providing heat energy, a capacitor for storing electrical energy for use by the nuclear fusion device in providing the heat energy, and an electrical conductor for carrying electrical energy from the capacitor to the nuclear fusion device, each of the nuclear fusion device, the capacitor and the conductor being located within a first chamber. The first chamber is located within a second chamber. A fluid is located between the first and second chambers, surrounds the nuclear fusion device, the capacitor and the conductor, and receives heat energy from each of the nuclear fusion device, the capacitor and the conductor, resulting in the fluid being heated. A thermal energy converter receives heated fluid from the second chamber. A super insulating material encloses the second chamber to reduce heat loss from the heated fluid to the cooler ambient.

9 Claims, 22 Drawing Sheets

(56) References Cited

U.S. PATENT DOCUMENTS

| | | | | |
|---|---|---|---|---|
| 4,362,689 A | | 12/1982 | Teichmann et al. | 376/148 |
| 4,370,295 A | * | 1/1983 | Bussard | 376/133 |
| 4,414,176 A | * | 11/1983 | Krauss et al. | 376/136 |
| 4,416,845 A | * | 11/1983 | Salisbury | 376/107 |
| 4,444,717 A | | 4/1984 | De Breze | 376/194 |
| 4,446,096 A | * | 5/1984 | Auchterlonie | 376/145 |
| 4,650,630 A | | 3/1987 | Boyer | 376/107 |
| 4,657,290 A | * | 4/1987 | Linden | 290/2 |
| 4,698,198 A | * | 10/1987 | Gruen | 376/146 |
| 4,912,731 A | * | 3/1990 | Nardi | 376/145 |
| 4,924,818 A | * | 5/1990 | Linden | 123/41.14 |
| 4,939,444 A | * | 7/1990 | Cacheux | H01F 6/00 323/360 |
| 5,041,760 A | | 8/1991 | Koloc | 315/111.41 |
| 5,162,094 A | | 11/1992 | Curtis | 376/107 |

OTHER PUBLICATIONS

Selim et al. "Stress analysis using Bremsstrahlung radiation." Copyright JCPDS—International Centre for Diffraction Datea 2003, Advances in X-ray analysis, vol. 46, pp. 106-111.*

"Nuclear Fusion." <http://en.wikipedia.org/wiki/Nuclear_fusion.> downloaded Oct. 28, 2006. pp. 1-14.*

"The Second Law." MIT OpenCourseWare. 5.60 Spring 2005. Lectures #9-10. pp. 1-5.*

Sharif et al. "X-ray emission scaling law from a plasma focus with different anode tip materials." Journal of Applied PHysics 100, 073301 (2006).*

Carnot Cycle . explanation.*

"The Second Law", Lecture # 9-10, Spring 2005.*

Cheung et al."Colliding Beam Fusion Reactor Space Propulsion System", STIAF 2004, APS, 2004. p. 354-361.*

Rostoker, Cheung et al."Colliding Beam Fusion Reactor Space Propulsion System", STIAF 2004, APS, 2004. p. 354-361.*

"The second Law", 5.60 Spring 2005, Lecture #9-10, Berkeley.*

Raspa et al., "Plasma focus based repetitive source of fusion neutrons and hard x-rays.", 2008, http:www.physmathcentral.com.*

Fusion Power, 2009, http://en.wikipedia.org.*

Panarella et al.,"Feasibility of a Thermonuclear REactor with Net energy Gain Based on Present Knowledge of Fusion Technology," Current Trends in International Fusion Research: Proceedings of the Fourth Symposium, Washington, D.C., Mar. 12-16, 2001, pp. 95-142 (Parts 1 and 2).*

Hofstrand et al., "What is a Feasibility Study?", http://www.extension.iastate.edu/agdm/wholefarm/html/c5-65.html, accessed Apr. 12, 2011.*

Feasibility Study—requirements, http://www.rurdev.usda.gov/or/biz/feasibility.pdf, accessed Apr. 12, 2011.*

An Engineering Design Study of a Reference Theta-Pinch Reactor (RTPR) Mar. 1974.*

Yonas, "Fusion Power with Particle Beams", Scientific American, vol. 239, No. 5 (Nov. 1978), pp. 50-61. (Year: 1978).*

Cheng, "Nucleonic Design for a Compact Tokamak Fusion Reactor Blanket and Shield", Nuclear Technology, vol. 45 (Aug. 1979) pp. 77-98. (Year: 1979).*

Hurricane, "Fuel gain exceeding unity in an inertially confined fusion implosion", Nature 506, 343-348 (Feb. 20, 2014). (Year: 2014).*

McDonald, "Closed-Cycle Gas Turbine Applications for Fusion Reactors", ASME 81-GT-17, 1981. (Year: 1981).*

KulCinski, "The Technology of Controlled Nuclear Fusion", CONF-760935 (Sep. 1976) pp. 1259-1301. (Year: 1976).*

E. Panarella, "Analysis of the Fusion Breakeven Conditions for D-T Plasmas of Prescribed Temperature Evolution" in *Current Trends in International Fusion Research—Proceedings of the 1$^{st}$ Symposium* (ed. E. Panarella, Plenum Press, New York, 1997) p. 211.

J.S. Brzosko, J.H. Degnan, N.V. Filippov, B.L. Freeman, G.F. Kiutlu, and J.W. Mather, "Comments on the Feasibility of Achieving Scientific Breakeven with a Plasma Focus Machine" in *Current Trends in International Fusion Research—Proceedings of the 1$^{st}$ Symposium* (ed. E. Panarella, Plenum Press, New York, 1997) p. 11.

A. Shyam, and M. Srinivasam, Neutron Emission from a 100 Joule Plasma. *Appl. Physics* 17, 425 (1978).

Francesco Pegoraro. "Ignition Physics and the Ignitor Project" in *Current Trends in International Fusion Research—Proceedings of the 1$^{st}$ Symposium* (ed. E. Panarella, Plenum Press, New York, 1997) p. 125.

Andrew M. Sessler, Thomas H. Stix, and Marshall N. Rosenbluth, "Build the International Thermonuclear Experimental Reactor?", *Physics Today*, Jun. 1996, p. 21, and references therein.

Charles D. Orth, "Prospects for Inertial Fusion Energy Based on a Diode-Pumped Solid-State Laser (DPSSL) Driver: Overview and Development Path" in *Current Trends in International Fusion Research—Proceedings of the 2$^{nd}$ Symposium* (ed. E. Panarella, NRC Research Press, Ottawa, 1999) p. 241.

Spruce Pine Mica Company, Spruce Pine, N.C., U.S.A.—Internet address: http: // spruce-pine-mica.com/properti.htm.

The inductance formula for our capacitor geometry is provided on the web at: http://emclab.umr.edu/new-induct/trace-v.html.

R.A. Hill and J.W. Hubbs. A Multi-Shot Dense Plasma Focus with Improved Cathode Design. *Phys. Lett.* 98A, 417 (1983).

E. Panarella, and V. Guty. A Kiloampere Current Diode Based on the Quenched Spark Gap Switch. *J. Physics E: Scientific Instruments* 7, 835 (1974).

R.W. Conn. First Wall and Divertor Plate Material Selection in Fusion Reactors. *J. of Nuclear Materials* 76 & 77, 103 (1978).

The inductance formula for our coil geometry is provided on the web at:. http:/ / emclab . umr.edu/new-induct/circular.html.

* cited by examiner

| INPUT ENERGY E (J) | NUMBER OF NEUTRONS PRODUCED ($N_{prod}$) | FUSION ENERGY PRODUCED ($E_{prod}$) (J) | NUMBER OF NEUTRONS REQUIRED FOR BREAKEVEN ($N_{br}$) | FUSION ENERGY REQUIRED FOR BREAKEVEN ($E_{br}$) (J) | RATIO ($N_{prod}/N_{br}$) OR ($E_{prod}/E_{br}$) |
|---|---|---|---|---|---|
| (1) | (2) | (3) | (4) | (5) | (6) |
| $1.00 \times 10^2$ | $1.53 \times 10^7$ | $4.31 \times 10^{-5}$ | $1.07 \times 10^{14}$ | $3.02 \times 10^2$ | $1.43 \times 10^{-7}$ |
| $1.00 \times 10^3$ | $8.21 \times 10^8$ | $2.31 \times 10^{-3}$ | $1.07 \times 10^{15}$ | $3.02 \times 10^3$ | $7.67 \times 10^{-7}$ |
| $1.00 \times 10^4$ | $4.41 \times 10^{10}$ | $1.24 \times 10^{-1}$ | $1.07 \times 10^{16}$ | $3.02 \times 10^4$ | $4.12 \times 10^{-6}$ |
| $1.00 \times 10^5$ | $2.37 \times 10^{12}$ | $6.68 \times 10^0$ | $1.07 \times 10^{17}$ | $3.02 \times 10^5$ | $2.21 \times 10^{-5}$ |
| $1.00 \times 10^6$ | $1.27 \times 10^{14}$ | $3.59 \times 10^2$ | $1.07 \times 10^{18}$ | $3.02 \times 10^6$ | $1.19 \times 10^{-4}$ |

TABLE 1

FIG. 3

NUCLEAR FUSION SYSTEM THAT CAPTURES AND USES WASTE HEAT TO INCREASE SYSTEM EFFICIENCY

This application claims benefit of U.S. Provisional Application No. 60/274,211, filed Mar. 9, 2001.

FIELD OF THE INVENTION

The present invention relates to a thermonuclear fusion reactor and an energy conversion apparatus.

BACKGROUND OF THE INVENTION

The basic configuration of a thermo-nuclear fusion reactor, as presently conceived is shown in FIG. 1. The fusion reactor, generally shown at reference numeral 1, comprises a fusion reactor chamber 3 containing fusion fuel, usually a mixture of deuterium and tritium (D-T), surrounded by a liquid blanket 5. Energy for driving the nuclear reactor is provided by an electrical energy source 7, for example, a charged condenser bank via a transmission line 9. In order to generate fusion reactions in the deuterium-tritium fuel, the fuel must be brought to the plasma state at very high temperature of the order of a few keV (i.e. 1 to 10 keV) (1 keV=11,600,000° K.).

The energy produced by the fusion reactions is carried out of the plasma 11 in the form of neutrons and alpha particles. Bremsstrahlung produced from the plasma during its burning cycle as well as other losses are also carried out of the plasma 11. The energy is deposited in the liquid blanket and converted to thermal energy which is subsequently converted into electricity and returned to the energy source.

In practice, not all of the energy from the energy source is conveyed to the fusion reactor, as some of the energy is lost as heat from the transmission line and not all of the thermal energy generated in the liquid blanket is converted into electricity, i.e. the conversion is not done with 100% efficiency. To achieve a break-even condition, the energy produced by the fusion reaction must equal the energy lost from the reactor system during one complete energy cycle.

The energy inventory of the fusion reactor illustrated in FIG. 1 is as follows, where "a" is the percentage of energy delivered from the energy source to the reactor and "b" is the percentage of thermal energy from the liquid blanket converted to electricity.

E initial available energy aE portion of the available energy transferred to the plasma chamber (1−a)E portion of the available energy dissipated as heat in the transmission line. This heat is transferred to the surrounding environment aE energy transferred from the plasma chamber to the liquid blanket mainly in the form of bremsstrahlung radiation and heat losses $E_R$ energy produced by the fusion reactions. This energy too is transferred to the liquid blanket $aE+E_R$ thermal energy available from the liquid blanket for conversion to electricity $b(aE+E_R)$ portion of the thermal energy converted to electricity that is returned to the energy source $(1-b)(aE+E_R)$ portion of the thermal energy that is not converted to electricity. This energy is deposited as heat in the surrounding environment.

For energy breakeven, it is clear that one must have:

$$E=b(aE+E_R) \qquad (1)$$

from which $$E_R = \frac{E(1-ab)}{b}. \qquad (2)$$

Assuming, for example, the typical values of a=b=30 percent, then:

$$E_R=3.03\ E \qquad (3)$$

This means that the fusion reactions must be able to generate 303 percent of the initial available energy just to have breakeven in this case of a=b=30 percent. For continuous energy production, this energy has to be produced during each cycle of plasma lifetime.

This is a large amount of fusion energy, and the challenge that the fusion research community has faced for the past 50 years lies with the difficulty of generating this amount of energy in one cycle of plasma burning.

The Nature and Extent of the Fusion Problem

In order to determine to what extent the fusion community has been able so far to satisfy Eq. (3) one needs to know how many fusion reactions one must have for breakeven during each cycle of plasma lifetime.

The neutrons and the α particles are the carriers of the energy from the reactions of deuterium-tritium out of the system. The energy $e_R$ released by these particles during one reaction is:

$$e_R = 14.1\ \text{MeV (neutron)} + 3.5\ \text{MeV }(\alpha\ \text{particle}) \qquad (4)$$
$$= 17.6\ \text{MeV} = 1.76 \times 10^7\ \text{eV} = 2.82 \times 10^{-12}\ \text{J},$$

because 1 eV=1.6022×10⁻¹⁹ J. Eq. (3) can be written in this way:

$$N\ e_R=3.03E, \qquad (3a)$$

where N is the total number of fusion reactions occurring during one plasma cycle.

For a given amount of energy E invested in the fusion system one must have, for breakeven, the following number of reactions when a=b=30 percent:

$$N = \frac{3.03}{e_R}E = \frac{3.03}{2.82 \times 10^{-12}}E = 1.07 \times 10^{12}E\ \text{reactions.} \qquad (5)$$

This means that one must be able to produce about $10^{12}$ reactions in a mixture of deuterium and tritium for each joule of energy expended in the fusion system, or to generate an equal number of neutrons, because each reaction releases one neutron. This is a large number of neutrons. The following analysis of the neutron yield of one of the best neutron producing fusion machines presently available, namely the plasma focus, shows that we are far away from this number.

The plasma focus has been extensively studied for the past 40 years and one such study is disclosed in J. S. Brzosko, J. H. Degnan, N. V. Filippov, B. L. Freeman, G. F. Kiutlu, and J. W. Mather "Comments on the Feasibility of Achieving Scientific Breakeven with a Plasma Focus Machine" in Current Trends in International Fusion Research—Proceedings of the 1$^{st}$ Symposium (ed. E. Panarella, Plenum Press, New York, 1997) p. 11. It is known that this machine produces the largest number of neutrons per joule of energy invested than any other fusion machine. However, this number is still not enough to satisfy the energy breakeven conditions given by Eq. (5) above. The experimental neutron yield from a plasma made up of deuterium as a function of the energy input from various plasma focus machines is shown in FIG. 2. As described in A. Shyam, and M. Srinivasam, Neutron Emission from a 100 Joule Plasma. Appl. Physics 17, 425 (1978) the neutron output scales as:

$$N=1.10 \times 10^2 E^{1.73} \text{ (E in J)}. \tag{6}$$

where E is in Joules.

If the reactions occur, not in deuterium, but in a 50% mixture of deuterium-tritium at a temperature that is typically assumed to be 2 keV, the cross section for fusion increases by a factor of 48.15, as described in [NRL Plasma Formulary (revised 1978), p. 37.] and the neutron output increases to:

$$N=5.30 \times 10^3 E^{1.73} \text{ (E in J)}. \tag{6'}$$

In Table 1, shown in FIG. 3, the neutrons $N_{prod}$ produced by a plasma focus is reported in column 2 as a function of the input energy E (column 1), in a range of energies where experiments have been carried out, as shown graphically in FIG. 2. In column 3 of Table 1, the respective total output energies $E_{prod}$ generated by the reactions are reported. The number of neutrons required for breakeven ($N_{br}$) is reported in column 4 according to formula (5), and the respective energies of the reactions ($E_{br}$) are reported in column 5. The last column 6 gives the ratio of the actual neutrons produced $N_{prod}$ and the neutrons required for breakeven $N_{br}$, or the ratio of the corresponding energies $E_{prod}$ and $E_{br}$.

Column 6 clearly points out the seriousness of the fusion problem. We are in fact from 4 to 7 orders of magnitude away from reaching breakeven conditions. From the data in this Table, if one considers scaling up the plasma focus in order to bring it up to the energy required for breakeven, one can see that 10,000 condenser banks of 1 megajoule each should be used. This is because, with 1 MJ of input energy ($=10^6$ J, last row in the Table), we are about 10,000 times short of reaching breakeven. Since one megajoule condenser bank normally occupies a good size room, it is clear that the size of such apparatus would be prohibitively large and costly.

The many other machines that have been employed in the past 50 years in an attempt to solve the fusion problem (tokamak, stellarator, z-pinch, spherical pinch, magnetized target fusion, laser, ion or electron beam, spheromak, etc.) have all failed to come any closer to the solution of this problem. This does not mean that they cannot solve it. It simply means that they are presently quite away from the solution. As a consequence, the direction that fusion research has recently taken is towards self-ignition. This requires that the α particles be retained within the plasma itself so that the heat generated by them is of such an extent to compensate for bremsstrahlung and other losses. Once ignition is achieved at one point of the plasma, it will then propagate and burn the rest of it. Machines that will work on such principle are being designed (Ignitor [Francesco Pegoraro. "Ignition Physics and the Ignitor Project" in Current Trends in International Fusion Research—Proceedings of the 1$^{st}$ Symposium (ed. E. Panarella, Plenum Press, New York, 1997) p. 125], ITER [Andrew M. Sessler, Thomas H. Stix, and Marshall N. Rosenbluth, "Build the International Thermonuclear Experimental Reactor?", Physics Today, June 1996, p. 21, and references therein]), and built (National Ignition Facility—NIF) [Charles D. Orth, "Prospects for Inertial Fusion Energy Based on a Diode-Pumped Solid-State Laser (DPSSL) Driver: Overview and Development Path" in Current Trends in International Fusion Research—Proceedings of the 2$^{nd}$ Symposium (ed. E. Panarella, NRC Research Press, Ottawa, 1999) p. 241]). However, it has not been convincingly proven, at least at the conceptual stage, that they will work, and, in even assuming that they will, the practical solution of the fusion problem offered by these machines with a working reactor is likely to be at least 10 years away.

The foregoing considerations lead to the conclusion that the fusion problem has not been solved because the number of fusion reactions that are actually obtained from existing machines is lower by several orders of magnitude than what is required for breakeven.

SUMMARY OF THE INVENTION

According to one aspect of the present invention, there is provided a nuclear fusion apparatus comprising: a nuclear fusion device for producing nuclear fusion reactions, a source of energy and energy conveying means for conveying energy from the source to the fusion device; and a chamber containing a body of fluid, wherein the chamber is arranged such that the fluid receives heat from the energy conveying means.

Advantageously, this arrangement allows energy which is lost in the form of heat between the energy source and the fusion device to be recovered through its absorption into a confined fluid. This arrangement is particularly advantageous where the energy source is an electrical energy source and the energy conveying means comprises an electrical conductor. With such an arrangement, the objective of obtaining a breakeven point can be considerably advanced.

In one embodiment, the chamber at least partially or completely encloses the energy conveying means. Advantageously, the chamber may also enclose the fusion device.

In one embodiment, the apparatus further comprises an enclosure containing a body of fluid, wherein the enclosure is arranged such that the fluid receives heat from the energy source. This is particularly advantageous, for example where the energy source comprises an electrical energy store such as a storage capacitor or bank of storage capacitors whose electrodes dissipate heat when the capacitor is discharged to drive the fusion device. The enclosure may comprise a chamber which also encloses at least one of the fusion device and the energy conveying means.

In one embodiment, the apparatus further comprises energy conversion means for converting the heat energy absorbed by the fluid into energy having a form for driving the fusion device.

In one advantageous embodiment, the apparatus further comprises a container containing a body of fluid, the container being arranged such that heat generated by the energy conversion means is absorbed into the fluid contained therein. This arrangement allows heat which would otherwise by dissipated in the conversion of heat into for example work and/or electrical energy to be retained within the apparatus for use for example by the energy conversion means. This configuration can also considerably advance the objective of attaining a breakeven point. In one embodiment, a portion of the energy conversion means that generates heat during energy conversion is enclosed in the chamber which encloses the energy conveying means and/or the fusion device and/or the energy source.

In a preferred embodiment, the body of fluid is arranged to absorb the majority of energy of nuclear particles produced by fusion reactions in the fusion device.

In one embodiment, a further chamber is provided which is enclosed within the first mentioned chamber above, wherein the further chamber encloses the energy source, the energy conveying means and the fusion device. The further chamber may contain pressurized gas for preventing electrical discharge between parts of the energy source, the energy conveying means and the fusion device subjected to large electric fields.

According to another aspect of the present invention there is provided an apparatus comprising a body for receiving fluid, a device in said body arranged such that the energy of said fluid can be converted into kinetic energy of the device, and super insulator means arranged to resist the flow of heat from said fluid away from said body.

Advantageously, this arrangement provides an energy conversion apparatus which can convert the heat energy stored in a fluid into mechanical work whereby heat which would otherwise be lost from the apparatus is retained within the apparatus providing the opportunity of using heat from the fluid which may not be used in energy conversion in the first pass through the apparatus to be reused in another pass through the apparatus or for some other purpose. The principles of this arrangement may be applied to any power generating plant, including but not limited to one whose energy source is a fusion device. Advantageously, this arrangement can considerably advance the objective of achieving breakeven point when applied to a fusion reactor.

Features of embodiments of the apparatus are defined in the claims.

According to another aspect of the present invention, there is provided an apparatus for driving an energy conversion apparatus comprising a heat source, a fluid at least partially surrounding heat source and super insulator means arranged to resist the flow of heat away from said fluid.

Advantageously, this arrangement can further advance the objective of achieving a breakeven point in a nuclear fusion apparatus.

According to another aspect of the present invention, there is provided a nuclear fusion system comprising: a nuclear fusion device, the nuclear fusion device being configured to provide heat energy; at least one capacitor, the at least one capacitor configured to store electrical energy which is usable by the nuclear fusion device in providing the heat energy; an electrically conductive member, the electrically conductive member being configured to carry electrical energy from the at least one capacitor to the nuclear fusion device; a first chamber having a first chamber wall, each of the nuclear fusion device, the at least one capacitor, and the electrically conductive member being located within the first chamber and enclosed by the first chamber wall; a second chamber defined by a second chamber wall, the first chamber being located within the second chamber, the second chamber containing a body of fluid therein, the fluid being located between the first chamber wall and the second chamber wall, the fluid surrounding the first chamber wall, the nuclear fusion device, the at least one capacitor, and the electrically conductive member, and the fluid being arranged to receive heat energy from each of the nuclear fusion device, the at least one capacitor, and the electrically conductive member, which would result in the fluid being a heated fluid; a thermal energy converter, part of the converter being located within the first chamber, part of the converter being located within the second chamber, the converter being configured to receive heat energy from the heated fluid, the converter including a fluid inlet port located in the second chamber, the fluid inlet port being arranged to receive heated fluid, the converter comprising an electrical power generator, the generator being configured to convert at least some of the heat energy received by the converter into electrical energy, and the generator being coupled within the system to the at least one capacitor, which allows the generator to provide at least some of the electrical energy to the at least one capacitor; and thermal super insulating material, the insulating material comprising layers of reflective material, each adjacent layer separated by at least one spacer, and wherein the insulating material encloses and surrounds the second chamber, to provide insulation between the heated fluid and the cooler ambient, to reduce heat loss from the heated fluid to the cooler ambient.

According to another aspect of the present invention, there is provided a nuclear fusion system comprising: a nuclear fusion device, the nuclear fusion device being configured to provide heat energy; at least one capacitor, the at least one capacitor configured to store electrical energy which is usable by the nuclear fusion device in providing the heat energy; an electrically conductive member, the electrically conductive member being configured to carry electrical energy from the at least one capacitor to the nuclear fusion device; a first chamber having a first chamber wall, each of the nuclear fusion device, the at least one capacitor, and the electrically conductive member being located within the first chamber and enclosed by the first chamber wall; a second chamber defined by a second chamber wall, the first chamber being located within the second chamber, the second chamber containing a body of fluid therein, the fluid being located between the first chamber wall and the second chamber wall, the fluid surrounding the first chamber wall, the nuclear fusion device, the at least one capacitor, and the electrically conductive member, and the fluid being arranged to receive heat energy from each of the nuclear fusion device, the at least one capacitor, and the electrically conductive member, which would result in the fluid being a heated fluid; a thermal energy converter, the converter being configured to receive heat energy from the heated fluid, the converter including a fluid inlet port in communication with the second chamber, the fluid inlet port being arranged to receive heated fluid, the converter comprising an electrical power generator, the generator being configured to convert at least some of the heat energy received by the converter into electrical energy, and the generator being coupled within the system to the at least one capacitor, which allows the generator to provide at least some of the electrical energy to the at least one capacitor; and thermal super insulating material, the insulating material comprising layers of reflective material, each adjacent layer separated by at least one spacer, and wherein the insulating material encloses and surrounds the second chamber, to provide insulation between the heated fluid and the cooler ambient, to reduce heat loss from the heated fluid to the cooler ambient, and the insulating material encloses and surrounds at least part of the thermal energy converter to provide insulation between the at least part of the thermal energy converter and the cooler ambient, to reduce heat loss from the heated fluid to the cooler ambient.

According to another aspect of the present invention, there is provided a nuclear fusion system comprising: a nuclear fusion device, the nuclear fusion device being configured to provide heat energy; at least one capacitor, the at least one capacitor configured to store electrical energy which is usable by the nuclear fusion device in providing the heat energy; an electrically conductive member, the electrically conductive member being configured to carry electrical energy from the at least one capacitor to the nuclear fusion device; a first chamber having a first chamber wall, each of the nuclear fusion device, the at least one capacitor, and the electrically conductive member being located within the first chamber and enclosed by the first chamber wall; a second chamber defined by a second chamber wall, the first chamber being located within the second chamber, the second chamber containing a body of fluid therein, the fluid being located between the first chamber wall and the second chamber wall, the fluid surrounding the first chamber wall, the nuclear fusion device, the at least one capacitor, and the electrically conductive member, and the fluid being arranged to receive heat energy from each of the nuclear fusion device, the at least one capacitor, and the electrically conductive member, which would result in the fluid being a heated fluid; a thermal energy converter, the converter being configured to receive heat energy from the heated fluid, the converter including a fluid inlet port in communication with the second chamber, the fluid inlet port being arranged to receive heated fluid, the converter comprising an electrical power generator, the generator being configured to convert at least some of the heat energy received by the converter into electrical energy; and thermal super insulating material, the insulating material comprising layers of reflective material, each adjacent layer separated by at least one spacer, and wherein the insulating material encloses and surrounds the second chamber, to provide insulation between the heated fluid and the cooler ambient, to reduce heat loss from the heated fluid to the cooler ambient, and the insulating material encloses and surrounds at least part of the thermal energy converter to provide insulation between the at least part of the thermal energy converter and the cooler ambient, to reduce heat loss from the heated fluid to the cooler ambient.

Features of embodiments of this aspect of the present invention are defined in the claims.

BRIEF DESCRIPTION OF THE DRAWINGS

Examples of embodiments of the present invention will now be described with reference to the drawings, in which:

FIG. 3 shows Table 1 containing a tabulation of experimental data including the neutron yield and fusion energy produced as a function of input energy, using equation (6);

DESCRIPTION OF THE PREFERRED EMBODIMENTS

Aspects of the present invention are concerned with improvements of fusion reactor design and the advancement of fusion reactor design to achieve breakeven. Before describing these improvements, a discussion will first be given to explain what is required in the way of improvement in reactor design to achieve the breakeven point using a fusion reactor having the current levels of neutron yield.

Consideration of Energy Transfer Efficiency from
the Energy Source to the Plasma and the
Conversion Efficiency of Thermal to Electrical
Energy The number of reactions in a fusion reactor is a function of the parameters a (energy transfer efficiency from the source of energy to the plasma), and b (conversion efficiency of thermal to electrical energy), as Eq. (2) shows. To examine the effect of these two parameters on breakeven, Eq. (2) is rewritten in the following way:

$$N \cdot e_R = \frac{E(1-ab)}{b}, \quad (2')$$

where $e_R$ is given by (4) and N has the same definition as before. Eq. (2') then becomes:

$$\frac{N}{E} = n = 3.55 \times 10^{11} \left(\frac{1}{b} - a\right). \quad (2'')$$

This equation shows that the number of reactions n (or neutrons) required for breakeven per unit of energy expended in creating a burning plasma is a function of the two parameters a and b, and that n decreases when a and/or b increase and approach 1, the largest possible value that they can have. For instance, when a=b=80 percent, the number n of reactions required for breakeven is reduced by about an order of magnitude to $1.60 \times 10^{11}$ relative to when a=b=30%.

It is towards ways to increase a and b in a feasible reactor that aspects of the present invention are concerned. Ideally, one would like to have a=b=1. Practically, it is important to know how close to a=b=1 one must be in order to have breakeven with present fusion machines.

Figure 4:
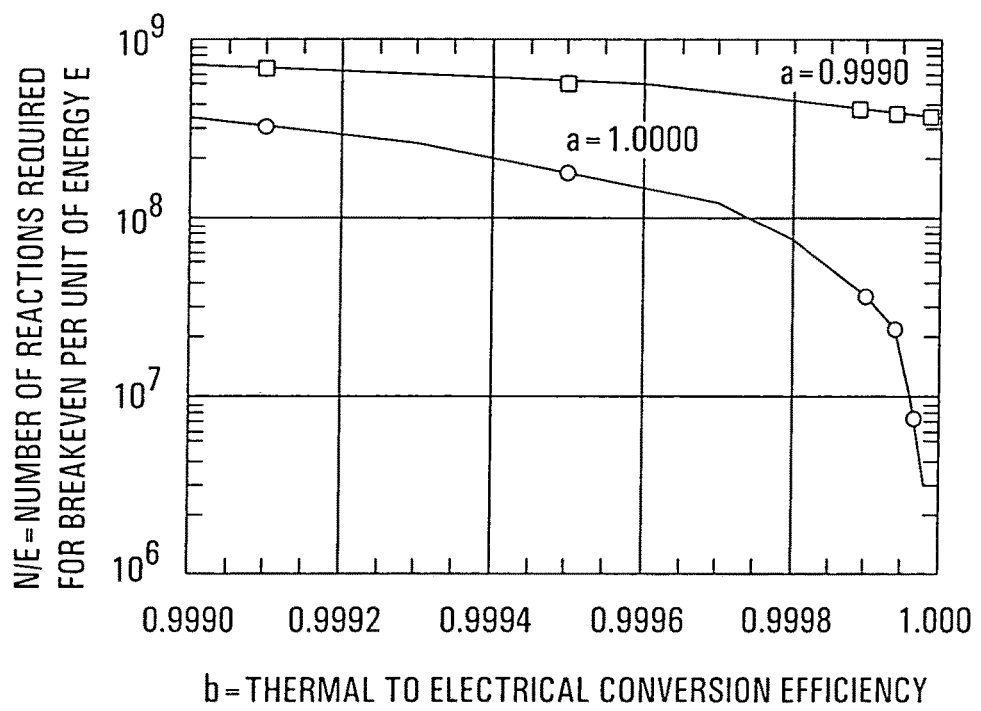
FIG. 4 shows a graph of the number of fusion reactions required for break even per unit of energy as a function of thermal energy to electrical energy conversion efficiency.

Taking from Table 1 the number N of fusion reactions already achieved with the plasma focus and their respective energies E, one can find analytically, with the help of two equations like Eq. (2''), the values of parameters a and b that are required for breakeven under these conditions. The results of such an analysis are depicted in FIG. 4 which shows two plots of n as a function of b, as derived from Eq. (2''), for a=0.9990 (top graph) and a=1.0000 (lower graph). From these graphs, and the knowledge of the range of number of neutrons presently generated in the plasma focus per unit of energy used, as reported in Table 1, it appears clearly that breakeven can be obtained only if one is able to have a=1.00000 and b between 0.99970 and 1.00000. For instance, with a $10^4$ J plasma focus that generates $4.41 \times 10^{10}$ neutrons, or $4.41 \times 10^6$ neutrons per 1 J of input energy, the parameter a has to be equal to 1, and b only slightly smaller than 1.

Attaining these values presents a larger challenge to fusion design. The farther away one is from breakeven with the neutrons obtained from the present plasma focus (or any other present machine), the closer to 1 the parameter b must be. By contrast, the more neutrons one will be able to generate in future machines, the less stringent will be the requirement that a and b be close to one.

Consideration of Parameter a

The consequence of having a parameter a different from 1 is that part of the initial available energy E from the source, rather than being used to create and heat the plasma, is used to produce heat in the transmission line from the condenser bank to the plasma chamber and within the source of energy itself. This is wasted heat that cannot be converted to electricity, because it is transferred to the environment surrounding the apparatus (see FIG. 1).

Figure 1:
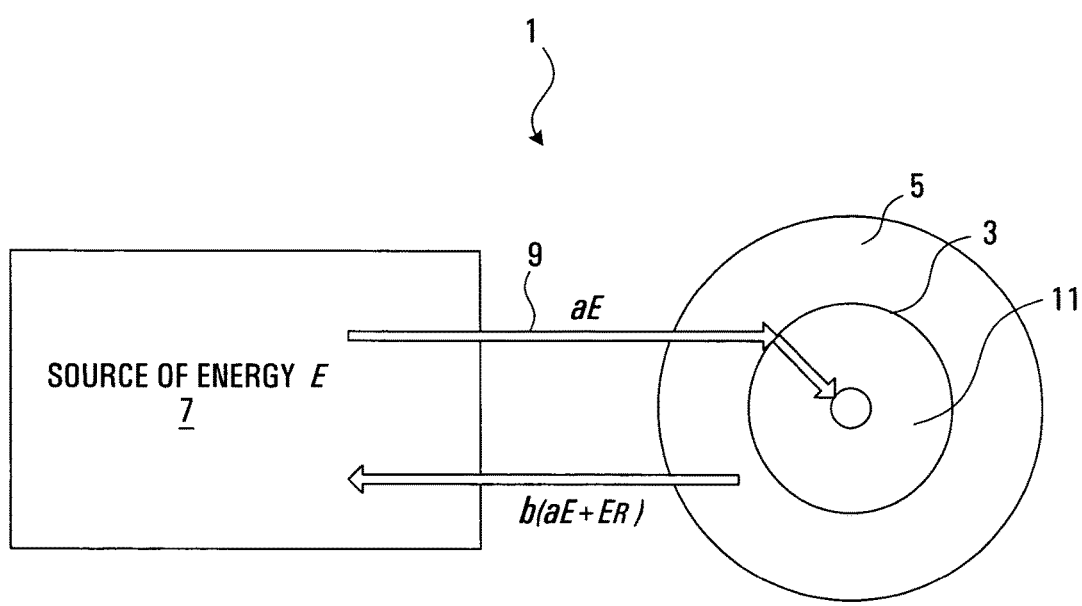
FIG. 1 shows a schematic diagram of a thermonuclear fusion reactor as presently conceived.
Figure 2:
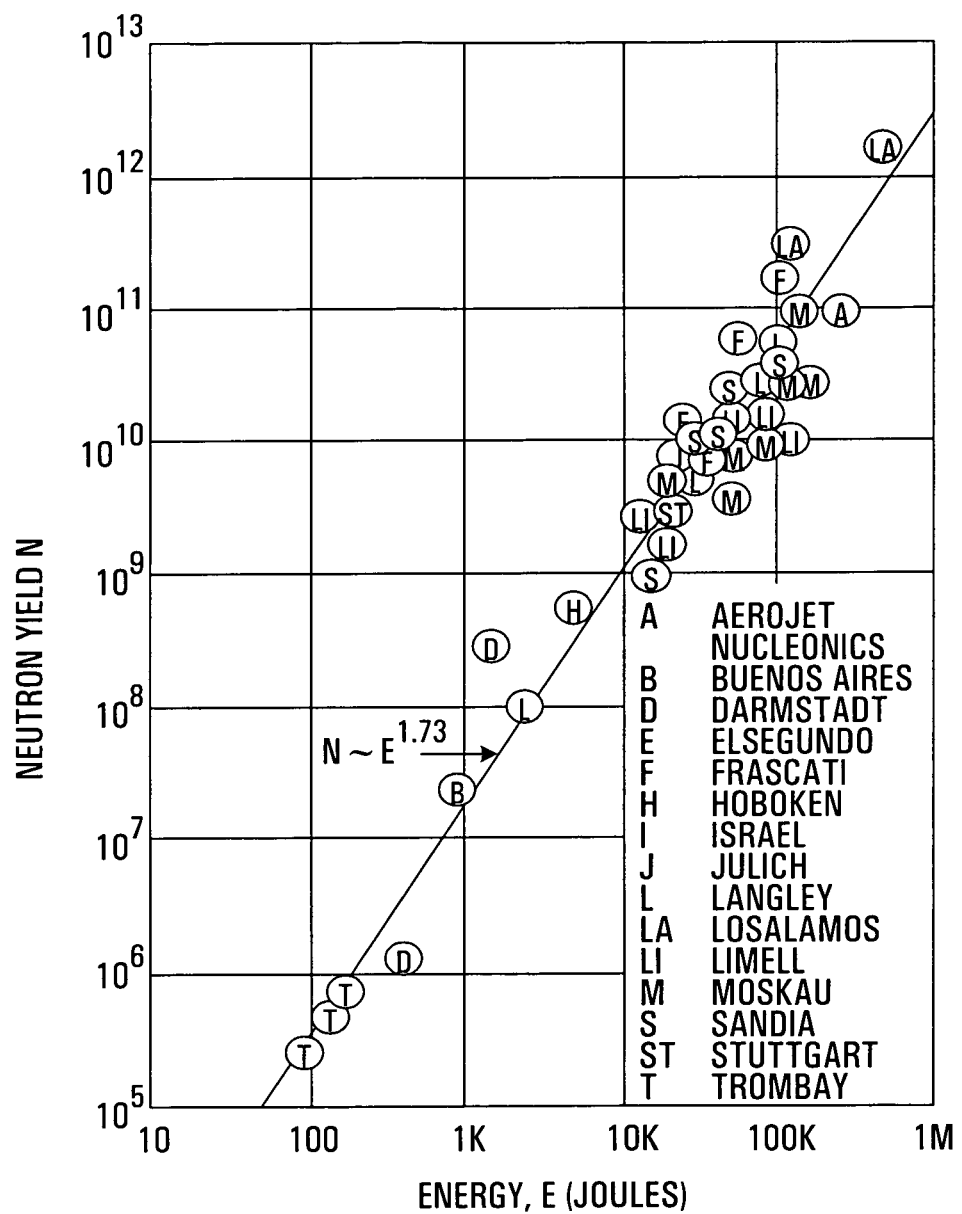
FIG. 2 shows a graph of the experimental neutron yield from a plasma made up of deuterium as a function of energy input from various plasma focus machines.

An examination of FIG. 1 shows, however, that one can decrease such losses by making the transmission line as short as possible. This is a step in the right direction, but not sufficient, since a value of a equal to 1 is required.

Fusion Reactor Design

Embodiments of a reactor design which are capable of increasing the energy transfer efficiency from the energy source to the fusion reactor plasma (i.e. the value of the parameter a) will now be described below.

Figure 5:
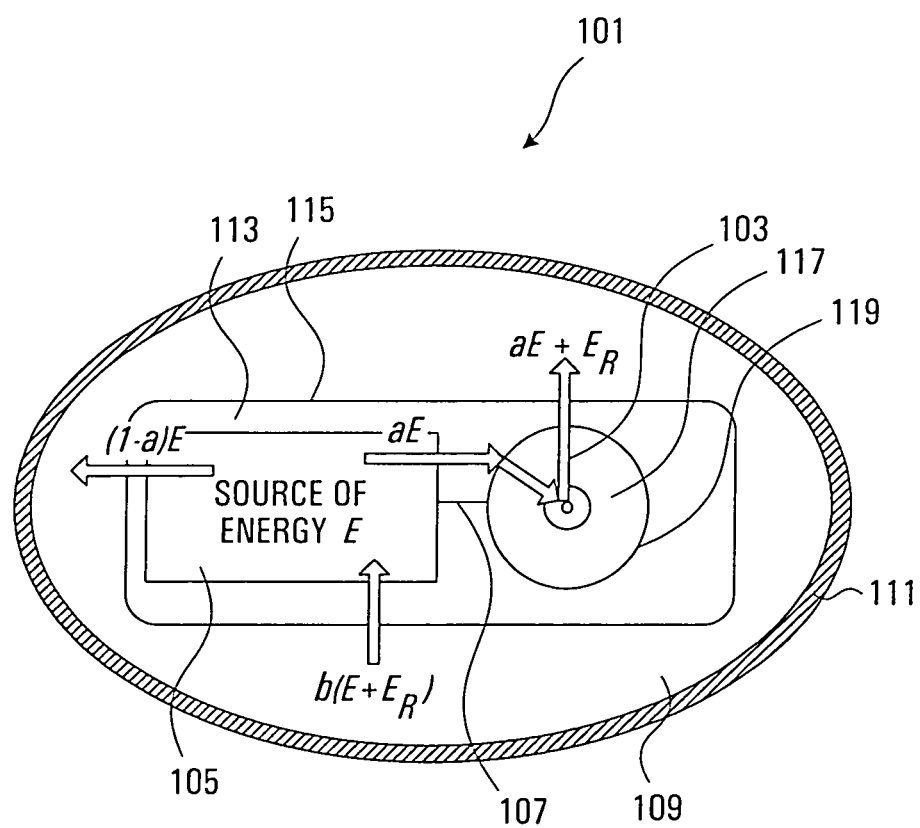
FIG. 5 shows a schematic diagram of a nuclear fusion apparatus according to an embodiment of the present invention.

Referring to FIG. 5, a nuclear fusion apparatus generally shown at 101 comprises a nuclear fusion device 103, a source of electrical energy 105 and an electrical transmission line 107 for supplying electrical energy from the source 105 to the nuclear fusion device 103. The apparatus further includes a chamber 109 having a chamber wall 111 which encloses the fusion device 103, the energy source 105 and the transmission line 107. The apparatus further includes an inner chamber 113 which also encloses the fusion device 103, the energy source 105 and the transmission line 107 and is enclosed within the outer chamber 109.

The fusion device 103 includes a plasma chamber 117 defined by a chamber wall 119.

In one embodiment, the energy source 105 may comprise a storage capacitor for storing electrical energy for driving the fusion device 103. The fusion device comprises any suitable device for generating fusion reactions and in one embodiment comprises a plasma focus fusion device. The transmission line 107 may comprise any suitable electrical conductor.

The outer chamber 109 serves to contain a fluid for absorbing heat produced by the fusion device 103 and from the energy source 105 and transmission line 107. The fluid may comprises a working fluid which can be used by an energy conversion apparatus for converting the heat absorbed thereby into mechanical and/or electrical energy and may comprise a liquid such as water.

The inner chamber 113 defined by the inner chamber wall 115 serves to separate the fluid contained in the outer chamber 109 from the fusion generator apparatus comprising the fusion device 103, the energy source 105 and the transmission line 107. The inner chamber 113, when in use, is filled with a fluid which enables heat to be conducted into the fluid contained in the outer chamber 109. Advantageously, the fluid contained in the inner chamber 113 may be pressurized to improve thermal conduction and to provide electrical insulation between parts of the fusion generator apparatus between which high electric fields are established. For example, the fluid in the inner chamber may comprise air, or helium, nitrogen or another gas, preferably an inert gas.

In another embodiment, the inner chamber 113 may be omitted altogether or the inner chamber may enclose one or any combination of the fusion device 103, the transmission line 107 and the energy source 105.

An important feature of this embodiment of the invention is the provision of a fluid which is arranged to absorb heat from the transmission line 107 and from the energy source 105. This is a significant departure from the presently conceived arrangement shown in FIG. 1 in which a fluid, e.g. a liquid blanket surrounds only the fusion device for absorbing energy from the plasma. In contrast, in the arrangement of the present embodiment, any heat generated by the transmission line or by the energy source itself is transferred to the heat absorbent fluid in the outer chamber 109, together with bremsstrahlung and heat losses from the plasma. As this arrangement allows the entire fusion generator apparatus to be surrounded by energy absorbing fluid as far as practically possible, the arrangement provides the opportunity for all of the heat from the energy source and the transmission line to be recovered. Therefore, this arrangement allows the heat losses from the transmission line to be directed into the heat absorbing fluid in the outer chamber so that these losses are eliminated as they can now fully be used for the conversion into electricity. Therefore, the arrangement allows the value of the parameter a=1 to be approached much more closely than hitherto, if not realized.

In order for such restructuring of the reactor to be possible, the components of the fusion apparatus should be able to withstand the high temperature environment of the fluid in the outer chamber (e.g. liquid blanket) which is typically of the order of 400° C.

The energy inventory of the restructured fusion reactor is now the following:

E initial available energy;
aE portion of the available energy transferred to the plasma chamber;
(1−a)E portion of the available energy transferred as heat to the liquid blanket;
aE energy transferred from the plasma chamber to the liquid blanket mainly in the form of bremsstrahlung radiation and heat losses;
$E_R$ energy produced by the fusion reactions. This energy too is transferred to the liquid blanket;
aE+(1−a)E+$E_R$=E+$E_R$ thermal energy available from the liquid blanket for conversion to electricity;
b(E+$E_R$) portion of the thermal energy converted to electricity that is returned to the energy source;
(1−b) (E+$E_R$) portion of the thermal energy not converted to electricity that is deposited as heat in the surrounding environment through heat losses from the liquid blanket.

For energy breakeven, one must have:

$$E=b(E+E_R)$$

from which $$E_R = \frac{E(1-b)}{b}. \qquad (2)$$

Assuming again the typical value of b=30 percent, one has:

$$E_R=2.33E. \qquad (3)$$

This is a more favorable situation than before. For a further advance towards achieving breakeven, the parameter b must increase to a value of between 0.99970 and 1.

Consideration of Parameter b

To achieve breakeven, the parameter b has to be 0.99970 or higher. This means that at least 99.97 percent of the thermal energy of the liquid blanket must be converted into electricity, depending on energy input. In another aspect of the present invention, the inventor has appreciated that this can be achieved if virtually all of the thermal energy of the heat absorbing fluid in the outer chamber is retained within the fluid itself, and not transferred to the surrounding environment. In other words, the losses from the fluid must be greatly reduced. Moreover, the conversion of thermal energy into electricity has to be done with the highest possible efficiency. In the following, these objectives will be shown to be attainable through a further restructuring of the reactor configuration.

Figure 6:
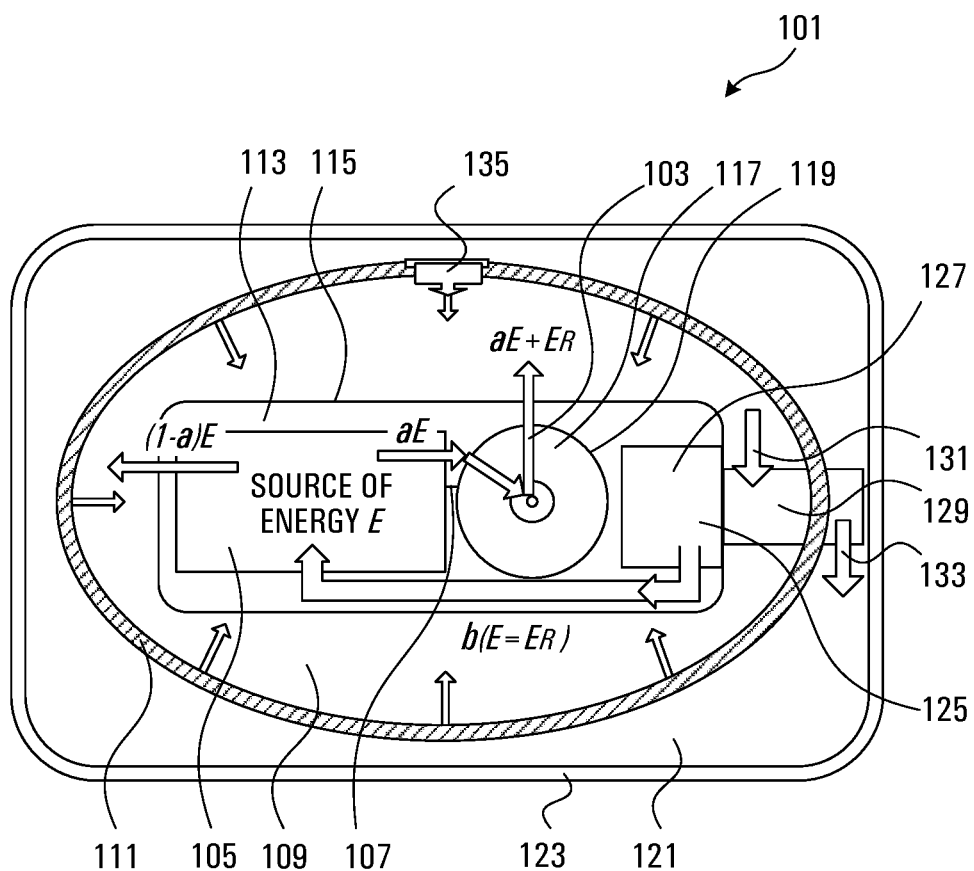
FIG. 6 shows a schematic diagram of a thermonuclear reactor according to another embodiment of the present invention.

One of the possible conceptual embodiments of a restructured reactor according to a second aspect of the invention is shown in FIG. 6.

Referring to FIG. 6, a nuclear fusion apparatus generally shown at 101 includes a fusion device 103, an energy source 105 and a transmission line 107 for delivering energy from the energy source 105 to the fusion device 103, the fusion device, the energy source and transmission line all being housed within an inner chamber 113, which in turn is enclosed within an outer chamber 109. Thus, this arrangement is similar to that shown in FIG. 5 and like parts are indicated by the same reference numerals.

Figure 6A:
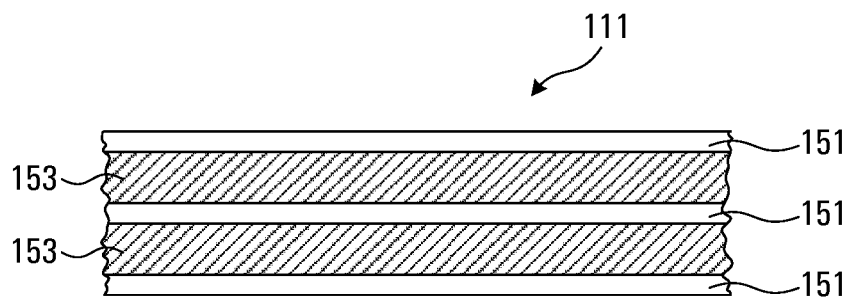

In this embodiment, the wall 111 enclosing the outer chamber 109 comprises a material that greatly reduces thermal losses from the heat absorbing fluid contained within the outer chamber 109 which may comprise for example saturated steam at 400° C. In a preferred embodiment, the material comprises a super insulator (or super insulating material), examples of which are presently used in cryogenic systems and discussed in J. P. Holman. Heat Transfer (McGraw-Rill, New York 1981), p. 10. Referring to FIG. 6A, in one embodiment, the wall 111 of the outer chamber may comprise a plurality of layers 151 of highly reflective material, each separated by one or more insulating spacers 153. The super insulating material may be evacuated to minimize air conduction thereby providing very low thermal conductivity. The use of a super insulator is capable of bringing thermal losses down to acceptable levels as will be discussed below.

Referring again to FIG. 6, the nuclear fusion apparatus further comprises another chamber 121 external of and surrounding the outer chamber 109, defined by a chamber wall 123.

Referring again to FIG. 6, the fusion apparatus further comprises a power generating apparatus 125 which is mostly enclosed within the outer chamber 109. Part of the power generating apparatus 125 is also enclosed within the inner chamber 113 and part of the power generating apparatus 125 is disposed outside the outer chamber in the external chamber 121. Thus, the power generating apparatus 125 is arranged such that parts which it is deemed appropriate or desirable to house within the inner chamber 113 are housed within the inner chamber 113, those parts which it is deemed appropriate or desirable to be placed outside the inner chamber but within the outer chamber 109 are placed within the outer chamber 109 and those parts which it is deemed appropriate or desirable to position within the external chamber 121 are placed within the external chamber 121. For example, one embodiment of the power generating apparatus 125 may comprise electricity generating apparatus 127 and the electricity generating apparatus may be conveniently disposed within the inner chamber 113 which may contain a non-conductive fluid in its ordinary state, such as air or helium. The electricity generating apparatus may also be conveniently disposed within the inner chamber 113 to minimize the distance between the electricity generating apparatus 127 and the source of electrical energy, for example, the electrical energy storage device 105, thereby minimizing the length of transmission line, e.g. electrical conductor, required to feed electrical energy from the generator 127 to the storage device 105. The power generating device may further comprise means 129 for converting the heat energy absorbed into the fluid contained in the outer chamber 109 into mechanical energy to drive the electricity generator 127, and may comprise for example a turbine or reciprocating mechanical device. The energy conversion apparatus 129 may be conveniently placed, at least in part, within the outer chamber 109. For example, in one embodiment, the energy conversion device includes an inlet port 131 for receiving fluid contained in the outer chamber 109 and therefore, the inlet 131 may be conveniently situated in the outer chamber 109. During the conversion of heat energy into mechanical energy (e.g. kinetic energy) the fluid normally undergoes cooling and therefore, it may be convenient to situate those parts of the energy conversion device 129 which are subjected to the cooler temperatures of the fluid as the heat energy is transformed into mechanical energy, in the external chamber 121.

In one embodiment, the energy conversion apparatus may comprise a steam turbine arranged to convert steam contained in the outer chamber 109 into mechanical energy. The external chamber may contain water at cooler temperatures for example at ambient temperatures or just above, e.g. at 20° C. In this embodiment, the portions of the turbine which is subjected to most heat are located within the outer chamber 109, i.e. in the saturated steam environment and those parts of the turbine which are subjected to cooler temperatures are located in the external chamber 121 which serves as a condenser. The turbine receives the high pressure saturated steam from its input port 131 and delivers the low pressure steam to the low pressure port 133 thus allowing the steam energy to be converted into work of rotation of the turbine which is used to drive the electrical generating apparatus 127 for the generation of electrical power which is then returned to the energy source 105.

The fusion apparatus further comprises a valve 135 which allows condensed fluid in the external chamber 121 to be returned to the outer chamber 109 to complete the cycle. Preferably, the valve comprises a unidirectional valve connecting the external chamber 121 to the outer chamber 109. Advantageously, this arrangement allows the working fluid to be continuously recycled and residual energy remaining in the fluid from the outlet of the energy conversion device to be returned to the outer chamber 109.

To illustrate the advance which the restructured fusion reactor apparatus described above offers in achieving the breakeven point, the energy inventory of the fusion reactor may be recalculated, by way of example assuming that the total thermal loss from the restructured system is between 0 and 0.3%, for example 0.05%. In this case, the energy inventory of the fusion reactor is as follows:

E initial available energy;

aE portion of the available energy transferred to the plasma chamber;

(1−a)E portion of the available energy transferred as heat to the liquid blanket;

aE energy transferred from the plasma chamber to the liquid blanket mainly in the form of bremsstrahlung radiation and heat losses;

$E_R$ energy produced by the fusion reactions. This energy too is transferred to the liquid blanket;

aE+(1−a)E+$E_R$=E+$E_R$ thermal energy available from the liquid blanket for conversion to electricity;

b(E+$E_R$)=0.99995(E+$E_R$) portion of the thermal energy converted to electricity that is returned to the energy source;

(1−b) (E+$E_R$)=0.00005(E+$E_R$) portion of the thermal energy that is not converted to electricity and that is deposited as heat in the surrounding environment.

For energy breakeven, one must have:

$$E=0.99995(E+E_R)$$

from which $$E_R = \frac{E(1-0.99995)}{b} = \frac{0.00005E}{0.99995} = 5\times 10^{-5} E \quad (2)$$

$$\frac{E_R}{E} = \frac{E_{prod}}{E_{br}} = 5\times 10^{-5}.$$

Table 1 shows that breakeven can be obtained in this case if the plasma focus is operated with an input energy of ~$10^5$ J=100 kJ.

Further details of an example of a specific reactor design will now be described for a relatively small reactor that can be accommodated in a standard plasma physics laboratory having particular regard to the following components of the reactor:

1. A fusion apparatus, comprising:
   A source of energy;
   A fusion device and plasma chamber wall;
   An energy delivery system;
   An inner chamber wall.
2. An outer (liquid blanket) chamber for containing heat absorbing fluid.
3. Electric power generating apparatus.

Fusion Apparatus

In one embodiment, the apparatus should be able to work in a 400° C. gaseous environment, i.e., at the same temperature of the liquid blanket and superheated steam surrounding it.

Source of Energy

In this example, the source of energy comprises a capacitor designed so as to be able to work in a 400° C. gaseous environment, although, in other embodiments, the source of energy may be any other suitable means.

The capacitor comprises first and second metallic plates separated by a suitable insulator. The metallic plates preferably have good electrical conductivity. Aluminum is one of the best metals that can be used for this purpose. No problem will arise in connection with the high temperature environment because the melting point of aluminum is well above 400° C. It is in fact 660° C.

The insulator preferably comprises a material having high dielectric strength and at the same time be capable of withstanding high temperatures without deterioration. A material that suits these characteristics is mica, although any other suitable material may be used. From the manufacturer's specifications, mica has the following properties [Spruce Pine Mica Company, Spruce Pine, N.C., U.S.A.-Internet address: http://spruce-pine-mica.com/properti.htm.

Maximum temperature with no decomposition: 400-500° C.;

Dielectric constant 6.5-9;

Dielectric strength (highest qualities 1-3 mils thick) 6,000-3,000 V/mil.

In the present embodiment, the apparatus is of small size. For this reason, a small capacitor will be considered, capable of storing 100 joules of energy, which is the minimum energy required for producing a measurable number of fusion reactions from the smallest plasma focus (see Table 1).

The formula used to calculate the area A of a capacitor storing energy E is:

$$A = d\frac{2E}{\varepsilon_o \varepsilon_r V^2}. \quad (7)$$

where V is the capacitor charging voltage, $\varepsilon_o$=8.854×$10^{-12}$ F/m is the vacuum permittivity, $\varepsilon_r$ is the relative permittivity (or dielectric constant) of the insulating material e.g. mica, and d is the thickness of the insulating material equal to the plate separation.

Eq. (7) has been derived from the formula relating energy E with capacitance C and voltage V:

$$E = \frac{1}{2}CV^2 \qquad (8)$$

and the formula relating capacitance C, area A, and thickness d:

$$C = \frac{\varepsilon_o \varepsilon_r A}{d}. \qquad (9)$$

For a given energy E stored in the capacitor (=100 J), the higher the voltage V, the smaller the capacitance C and thus the area A. Since in this embodiment, the capacitor is to be a physically small capacitor, the working voltage needs to be reasonably high, e.g. V=100 kV. Hence:

$$C = \frac{2E}{V^2} = \frac{2 \times 100}{(10^5)^2} = 2 \times 10^{-8} F. \qquad (10)$$

The separation between the capacitor plates is given by:

$$d = \frac{\text{Voltage}}{\text{Dielectric Strength}} = \frac{10^5 \text{ Volts}}{3000 \text{ Volts/mil}} = \frac{10^5 \text{ Volts}}{1.18 \times 10^8 \text{ Volts/m}} = 8.47 \times 10^{-4} \text{ m}. \qquad (11)$$

where 1 mil=0.001 in=2.54×10$^{-5}$ m. In the above formula a conservative value of 3000 Volts/mil for the dielectric strength of mica has been used. In all the design calculations of this embodiment, conservative parameters are used.

The area A of a capacitor capable of storing energy E=100 joules can now be obtained from Eq. (7):

$$A = d2\frac{E}{\varepsilon_o \varepsilon_r V^2} = \qquad (12)$$

$$8.47 \times 10^{-4} \frac{2 \times 100}{8.854 \times 10^{-12} \times 6.5 \times (10^5)^2} = 2.94 \times 10^{-1} \text{ m}^2.$$

The capacitor may have a rectangular geometry for practical reasons, i.e., for ease of accommodation in the fusion apparatus, although in other embodiments, the capacitor may have any other suitable shape. If we choose as its small side a=40 cm=0.40 m, the long side b of the rectangle is given by:

$$b = \frac{2.94 \times 10^{-1}}{0.40} = 0.74 \text{ m} = 74 \text{ cm} \qquad (13)$$

This is a capacitor of acceptable size.

Figure 7:
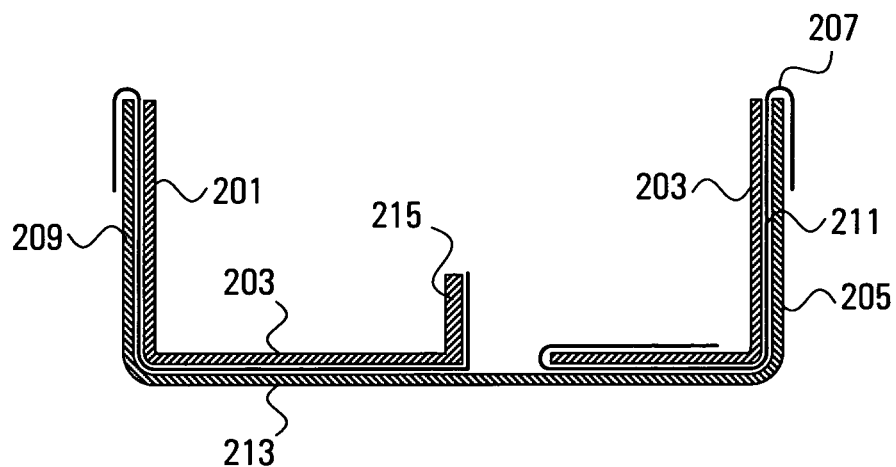
FIG. 7 shows a cross-sectional view of a storage capacitor for use with a fusion reactor according to an embodiment of the present invention.
Figure 9A:
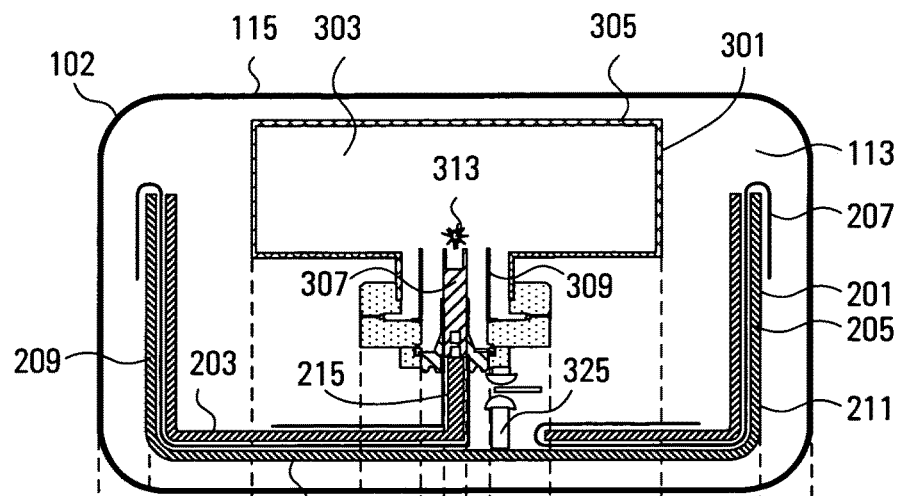
FIG. 9A shows a cross-sectional view through a nuclear fusion reactor according to an embodiment of the present invention that incorporates the capacitor of FIG. 7.
Figure 9B:
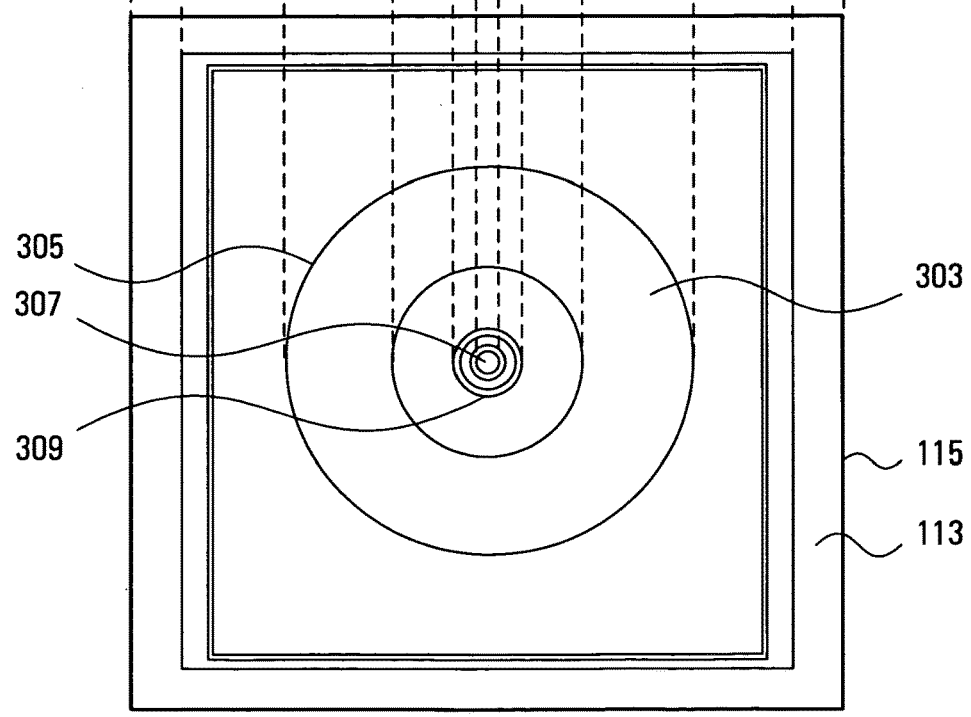
FIG. 9B shows a plan view of the embodiment shown in FIG. 9A.

An example of a preferred configuration of a capacitor is shown in FIGS. 7, 9A and 9B. FIG. 7 shows a cross section of the capacitor cut along the major side.

Referring to FIGS. 7, 9A and 9B, a capacitor 201 comprises a first conductive plate 203, a second conductive plate 205 and a dielectric insulator 207 between the first and second plates 203, 205. The ends of the capacitor 209, 211 extend upwardly and in this example extend upwardly above the base 213 of the capacitor by about 40 cm so that, in this example, the capacitor has a depth of 40 cm. One end 215 of the first plate 203 also extends upwardly for electrical connection to a fusion device.

The inductance L of this capacitor is given by: [The inductance formula for our capacitor geometry is provided on the web at: http://emclab.umr.edu/new-induct/trace-v.html.]

$$L \approx \frac{\mu_0 \mu_r h}{w} l \qquad (14)$$

where l is the length of the capacitor expressed in meters (l=0.7 m), $\mu_o$=4π×10$^{-7}$ henry/meter is the permeability of free space, $\mu_r$=1 is the relative permeability of the medium (mica), and w is the width of the two plates expressed in centimeters (=40 cm). The parameter h is equal to the thickness of the mica plus the thickness of one plate (expressed in centimeters). In this embodiment, the thickness of each plate is 0.8 cm whereas the thickness of the mica is 8.47×10$^{-2}$ cm. Hence:

$$L=19.45 \text{ nH}. \qquad (15)$$

If the thickness of each plate is reduced to 0.4 cm, the inductance decreases to 10.65 nH.

These inductances are sufficiently low for a Plasma Focus to be able to sustain the currents necessary for efficient neutron production. In fact, we know that neutron production in a Plasma Focus is related to current through the following relation: [A. Shyam, and M. Srinivasam, Neutron Emission from a 100 Joule Plasma. *Appl. Physics* 17, 425 (1978).]

$$N=6\times10^{-3} \cdot I^{4.29}, \qquad (16)$$

where the current I is in kiloamperes and neutron production occurs in a deuterium-deuterium mixture. The current I is therefore:

$$I = \left(\frac{N}{6 \times 10^{-3}}\right)^{\frac{1}{4.29}} = 63.17 \text{ kA}, \qquad (17)$$

after inserting N=3.18×10$^5$ for deuterium. This number has been derived from the knowledge that N=1.53×10$^7$ cm$^{-3}$ in deuterium-tritium (see Table 1, 1$^{st}$ row for a 100 joules condenser), and dividing by 48.15 for deuterium. In order to have a current of 63.17 kA in the condenser charged to 100 kV, the circuit should have an inductance no higher than:

$$L = \left(\frac{V}{I}\right)^2 C = \left(\frac{1 \times 10^5}{6.317 \times 10^4}\right)^2 \cdot 2 \times 10^{-8} = 5.01 \times 10^{-8} H. \qquad (17)$$

This is an inductance well above that of the embodiment of the capacitor described above (Eq. 15).

Fusion Device

In the present embodiment, the fusion device comprises a plasma focus fusion reactor although in other embodiments any other suitable fusion reactor may be used. An embodiment of a plasma focus fusion reactor is shown in FIG. 8.

Figure 8:
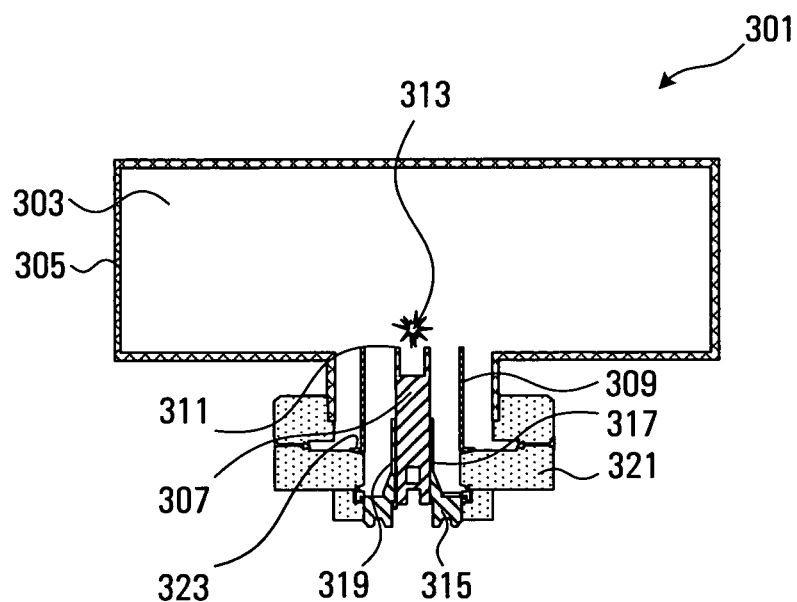
FIG. 8 shows a cross-sectional view through a fusion reactor chamber for use in an embodiment of the present invention.

Referring to FIG. 8, the plasma focus fusion reactor which is generally shown at 301 comprises a plasma chamber 303 defined by a plasma chamber wall 305 and first and second plasma forming electrodes 307, 309 extending into the chamber 303. In this embodiment, the first electrode 307 comprises a rod disposed within and spaced from the second electrode 309 which is cylindrical. The upper end 311 of the inner electrode 307 is shaped so as to produce the desired electric field profile and intensity required to generate fusion reactions as is well known to those skilled in the art. A neutron source resulting from fusion reactions is shown at 313. The fusion device further includes an inner seal comprising Kovar attached to the inner electrode via for example a stainless steel flathead screw. An outer seal 317 is provided which may also be made from Kovar. An insulator 319 surrounds the inner electrode 307 and preferably comprises a ceramic material and preferably alumina ($Al_{2O3}$) since it can be formed and machined to the desired shape and, after firing, can be braised to the inner and outer kovar seals 315, 317. The outer electrode 309 is attached to the base flange 321 of the vacuum chamber 303 for example via a small mounting collar 323.

The fusion device may be constructed from high vacuum components using metal-to-metal and ceramic-to-metal seals. The plasma chamber wall 305 preferably comprises a material that offers no or little resistance to the fusion neutrons passing through it and may comprise for example conventional glass, e.g. Pyrex. The first and second electrodes 307, 309 may be made from oxygen-free copper and the vacuum chamber flanges and walls may comprise stainless steel.

An example of a suitable fusion device is a dense plasma focus that can be fired repetitively such as the one described in R. A. Hill and J. W. Hubbs. A Multi-Shot Dense Plasma Focus with Improved Cathode Design. *Phys. Lett.* 98A, 417 (1983).

An example of a practical size of a plasma focus fusion device, which will be driven by the capacitor described above and shown in FIG. 7, is calculated below on the basis that the fusion chamber contains enough deuterium-tritium mixture to deliver energy, when burned, for, for example a total of 10 days of operation at 10 watts output power.

The amount of deuterium-tritium that will be burned is given by:

$$10 \text{ days} = 864,000 \text{ sec.}$$

$$10 \text{ watts} \times 864,000 \text{ sec} = 8,640,000 \text{ Joules}$$

$$\frac{8,640,000 \text{ Joules}}{2.82 \times 10^{-12} \text{ Joules per reaction}} \text{(see Eq. 4)} = \quad (18)$$

$$3.06 \times 10^{18} \text{ reactions.}$$

Since each reaction involves two atoms, we need to fuse $2 \times 3.06 \times 10^{18}$ atoms=$6.13 \times 10^{18}$ atoms.

The dense plasma focus will operate at 3 Torr pressure. [R. A. Hill and J. W. Hubbs. A Multi-Shot Dense Plasma Focus with Improved Cathode Design. *Phys. Lett.* 98A, 417 (1983).] At this pressure, since 1 Torr corresponds to $3.56 \times 10^{16}$ particles/$cm^3$, the particle number density of the mixture will be $3 \times 3.56 \times 10^{16}$ particles/$cm^3$=$1.07 \times 10^{17}$ particles/$cm^3$. Therefore, the volume of the gas mixture (fuel) will be:

$$\frac{6.13 \times 10^{18} \text{ atoms}}{1.07 \times 10^{17} \text{ atoms/cm}^3} = 57.27 \text{ cm}^3. \quad (19)$$

Assuming that we burn 1% of the available fuel, the reservoir of the deuterium-tritium mixture should have a volume equal to 5727 $cm^3$, i.e., over 5 liters. This is an acceptable volume.

As described in Ref. 11, the entire plasma focus assembly is given a vacuum bake at 300° C. for a pre-fill vacuum of $\approx 5 \times 10^{-9}$ Torr. Then it is filled with a 50% mixture of deuterium-tritium at 3 Torr pressure. The mixture reservoir, as shown from the scale of the drawing, has volume slightly over 5 liters.

Energy Delivery System

FIG. 9A shows a cross-sectional view of a fusion reactor assembly 102 according to an embodiment of the invention including the capacitor described above and shown in FIG. 7, the plasma focus fusion device 301 described above and shown in FIG. 8 operatively coupled to the capacitor 201, all enclosed within an inner chamber 113 by an inner chamber wall 115. FIG. 9A also shows an embodiment of a suitable switch 325 through which energy stored in the capacitor can be delivered to the plasma focus device. The positive plate 203 of the capacitor 201 is connected to the anode electrode 307 of the plasma focus device. The ground plate 205 of the capacitor 201 is connected to the cathode electrode 309 of the plasma focus device through a triggered switch 325 (e.g. a standard triggered switch). Alternatively, another type of switch that can be used is the Quenched Spark Gap Switch described in the literature [E. Panarella, and V. Guty, A Kiloampere Current Diode Based on the Quenched Spark Gap Switch. *J. Physics E: Scientific Instruments* 7, 835 (1974).].

Since, in this embodiment, the energy stored in the capacitor and delivered to the fusion device is at high voltage (e.g. 100 kV), the energy source, i.e. the capacitor, and the fusion device is contained in an atmosphere which does not break down at the operating electric fields. To this end, the inner chamber 113 which encloses the assembly may be filled with gas at high pressure, for example dry air at pressures of a few atmospheres should be enough for proper insulation of the apparatus.

The required repetition rate of operation of the plasma focus device will be a function of the rate of heat losses. In other words, the plasma focus must be able to generate enough fusion power to make up for the rate of thermal energy lost through the outer, heat reflective wall 111, shown in FIGS. 5 and 6. Although this wall greatly reduces thermal losses, they are however not zero, and the fusion power generated must be able to compensate for these losses in order to have at least power breakeven. Below, the thermal losses will be determined, and then used to determine the repetition rate of operation of the plasma focus.

Inner Chamber Wall

The wall of the inner chamber which encloses the energy source and fusion device preferably comprises a material which offers low resistance to neutrons and at the same time good thermal conductivity so that thermal equilibrium between the fluid contained in the outer chamber and the high pressure gas in the inner chamber is maintained. For example, the wall 115 of the inner chamber 113 may advantageously comprise stainless steel or any other suitable material which preferably has these properties.

Liquid Blanket Chamber

The fluid e.g. liquid blanket surrounding the fusion assembly is preferably arranged to absorb most of the neutrons generated in the fusion chamber in order to convert their kinetic energy into thermal energy of the water. On the other hand, in the present embodiment, absorption should take place within a short distance from the source in order to keep the apparatus small, i.e., on a laboratory scale. A suitable configuration of liquid blanket for this embodiment of the present invention is shown in FIGS. 10A and 10B.

Figure 10A:
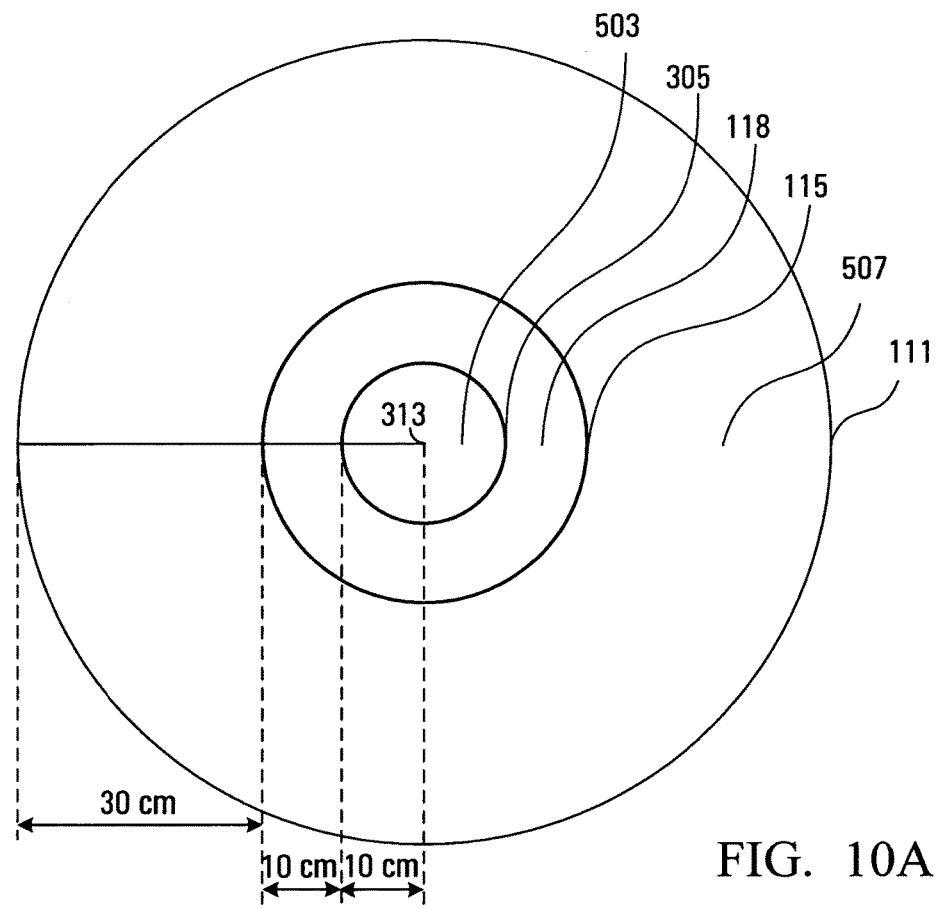
FIG. 10A shows a cross-sectional view through a fusion reactor according to another embodiment of the present invention.
Figure 10B:
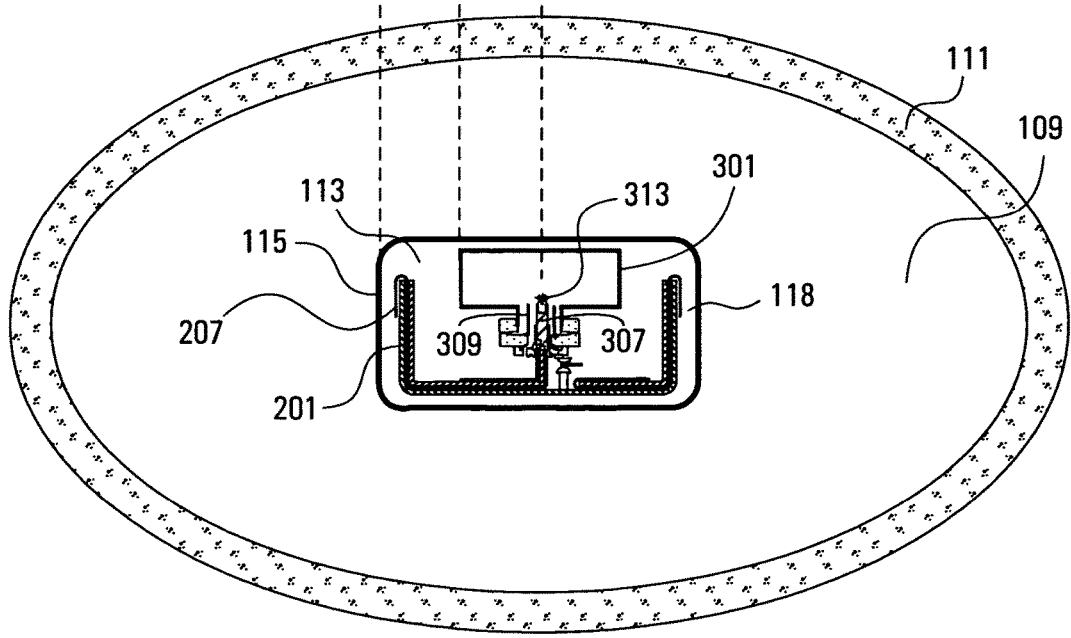
FIG. 10B shows a plan view of part of the fusion reactor shown in FIG. 10A.

FIG. 10A shows a top view of the various neutron absorbing materials of the reactor assembly shown in FIG. 10B. This configuration is used below to calculate the neutron absorption and in particular to determine a reasonable dimension of the thickness of the liquid blanket for use in the present embodiment of the invention. For the purposes of the calculation, a spherical configuration for neutron absorption, proceeding radially outwards from the center of the neutron source 313, is made up of a shield of deuterium-tritium 503 having a radius of 10 cm, a plasma chamber wall 305 having a thickness of 1 cm and comprising silicon (e.g. Pyrex glass), a shield of dry air 118 having a thickness of 10 cm. (i.e. the pressurized gas in the inner chamber 113), an inner chamber wall 115 comprising stainless steel and having a thickness of 1 cm and a liquid blanket 507 comprising water and having a thickness of 30 cm, and an outer wall 111 comprising beryllium and having a thickness of 1 cm. Advantageously, this arrangement provides strong neutron absorption although strong neutron absorption may be obtained by other configurations having different dimensions to those of the embodiment described above as would be apparent to those skilled in the art. Advantageously, the above embodiment meets the above mentioned design considerations in providing strong neutron absorption over a relatively short distance.

Further details of the neutron absorption calculations for the configuration shown in FIGS. 10A and 10B are given below.

On the basis of these design considerations, radiation transport calculations have been made using a software developed by SAIC (Science Applications International Corporation), designated by the name of STREAM. This acts as a pre- and post-processor for ANISN calculations. ANISN (ANIsotropic scattering using $S_n$ methods) is a one dimensional discrete ordinates transport code with anisotropic scattering. The primary uses of ANISM are to perform radiation shielding calculations. The STREAM software allowed the derivation of the neutron absorption through the above spherical shielding configuration.

The source of 14.1 MeV neutrons and 3.6 MeV α particles at the center of the assembly (the a particles are readily absorbed by the surrounding material) was considered to be a small sphere of 1 cm diameter. For reasons that will become apparent later on (i.e., from the calculation of the repetition rate required from a plasma focus), the flux of the 14.1 MeV neutrons should be at least $8.5 \times 10^{11}$ neutrons per second: a value of $5 \times 10^{12}$ neutrons per second will be considered in order to include some net energy gain, the gain being better defined later on by the repetition rate that can be reached by the plasma focus beyond 63.17 kHz (see Eq. 17).

A spherical geometry as shown in FIG. 10A was considered because it is a sufficiently close approximation to the embodiment shown in FIG. 10B. The numerical analysis was done by dividing the sphere in 200 zones, the first zone being located at the center of the sphere and the last one at the periphery.

Figure 11:
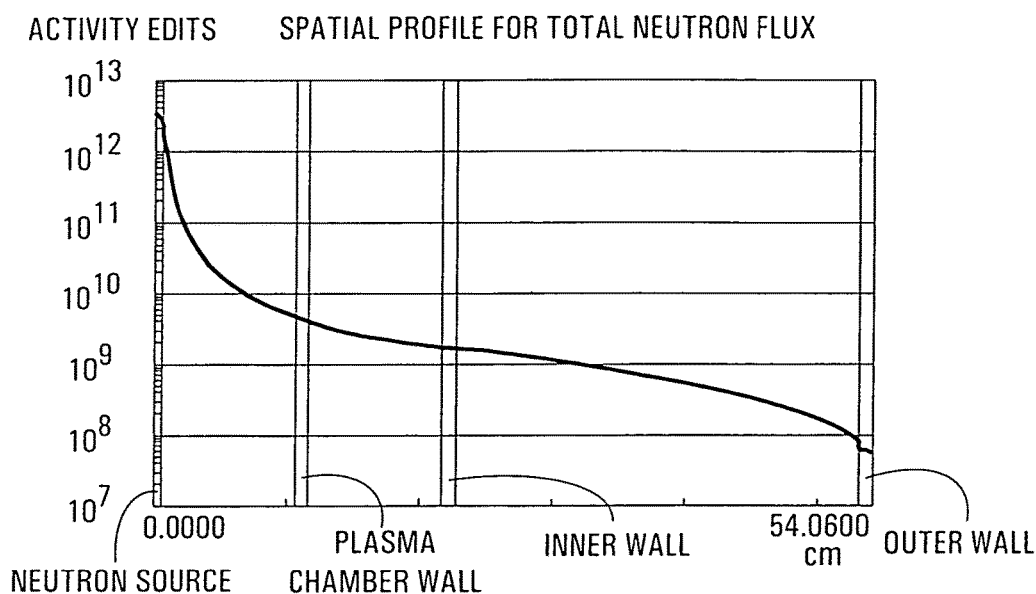
FIG. 11 shows a graph of an example of the total neutron flux as a function of distance along the radius of the fusion reactor assembly shown in FIGS. 10A and 10B.

The result of the calculations is shown in FIG. 11, where the total neutron flux (where 'total' means neutrons of any energy) is shown as a function of radius of the assembly. At the periphery of the assembly the flux is reduced from $5 \times 10^{12}$ to about $7 \times 10^7$. This is a reduction by 5 orders of magnitude, which means that most of the neutrons are absorbed within the sphere, their kinetic energy being converted into thermal energy available for electricity production. And this has been obtained with a sphere of relatively small radius of about 55 cm.

Figure 12:
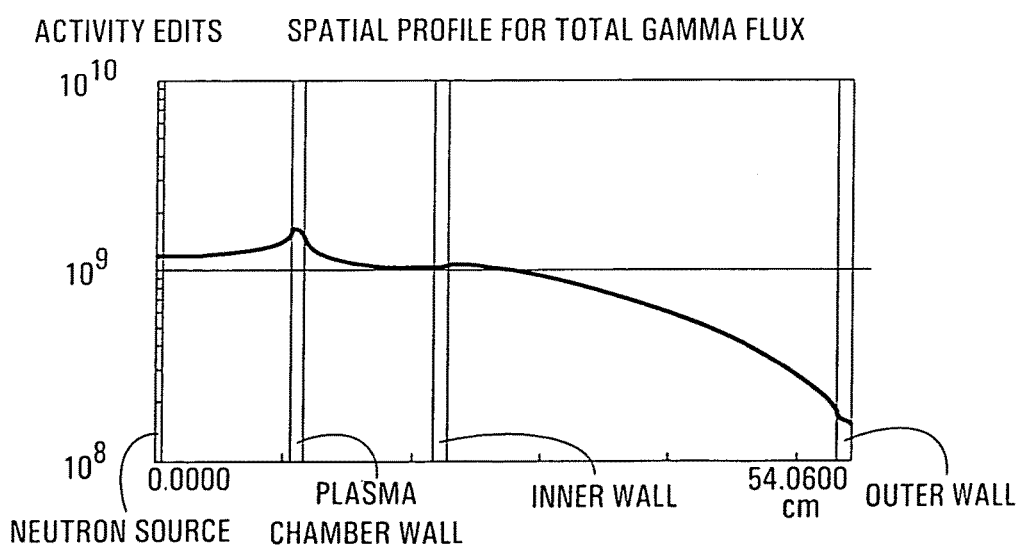
FIG. 12 shows a graph of an example of the total gamma flux as a function of distance along the radius of the fusion reactor assembly shown in FIGS. 10A and 10B.

FIG. 12 shows the total gamma flux, which is already quite low but is nevertheless reduced further from about $10^9$ to about $10^8$ $\text{sec}^{-1}$.

Figure 13:
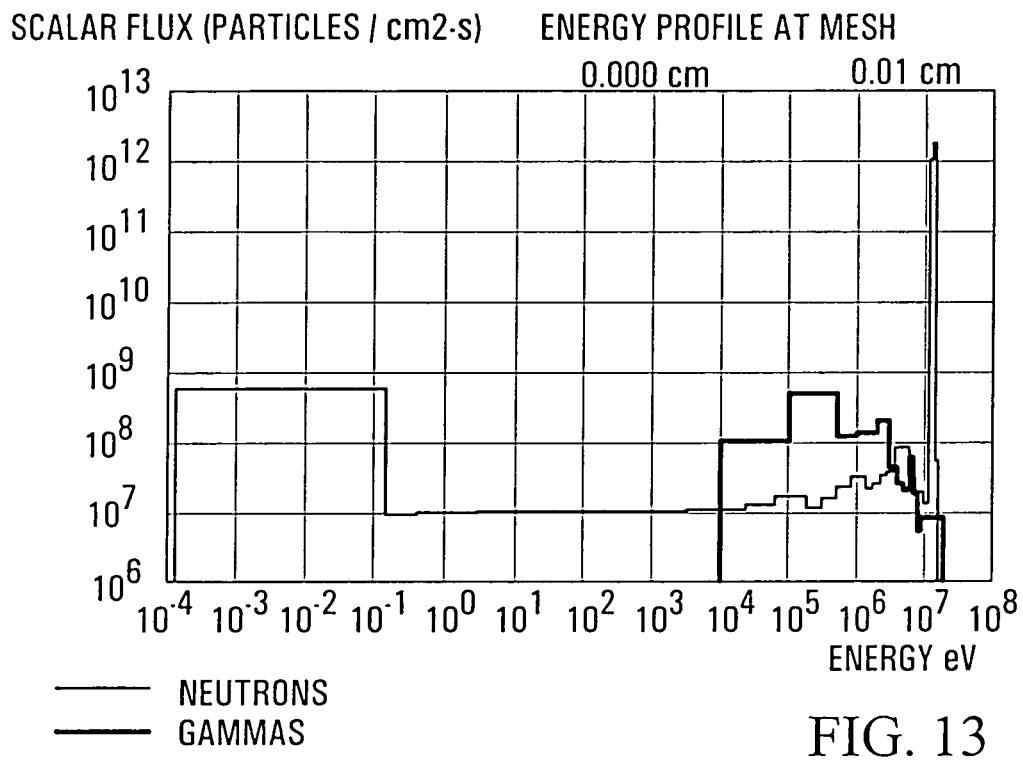
FIG. 13 shows a graph illustrating the profile of the scalar flux as a function of particle energy at mesh 1 in the center of the fusion reactor assembly shown in FIGS. 10A and 10B.
Figure 14:
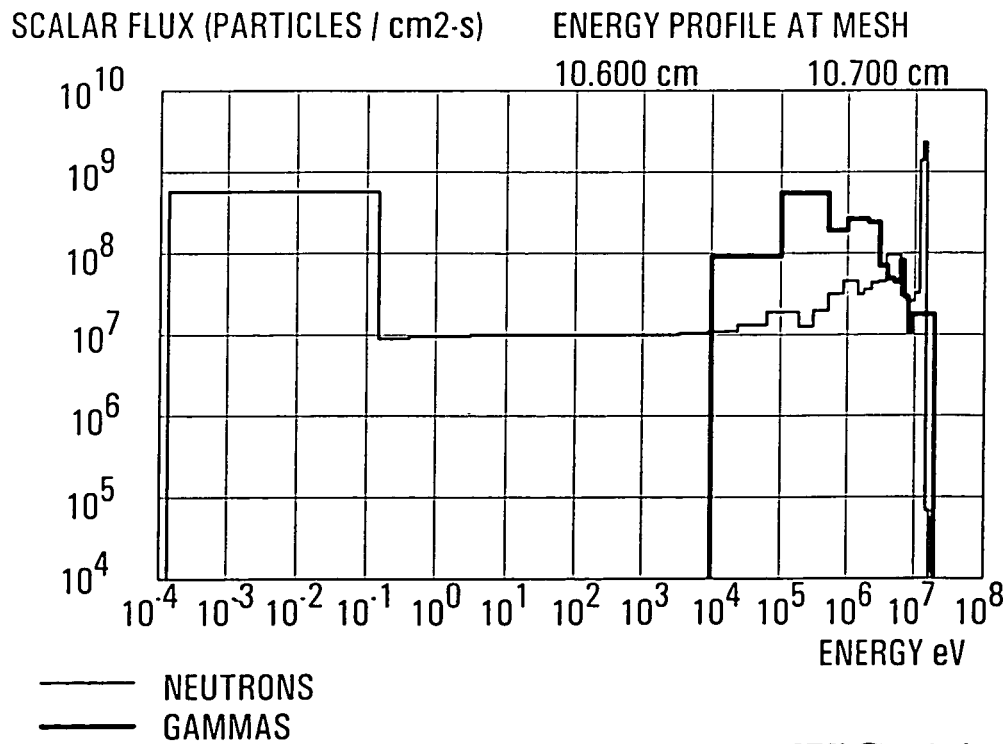
FIG. 14 shows a graph illustrating the profile of the scalar flux as a function of the particle energy at mesh 71 after the first wall of the nuclear fusion reactor assembly shown in FIGS. 10A and 10B.
Figure 15:
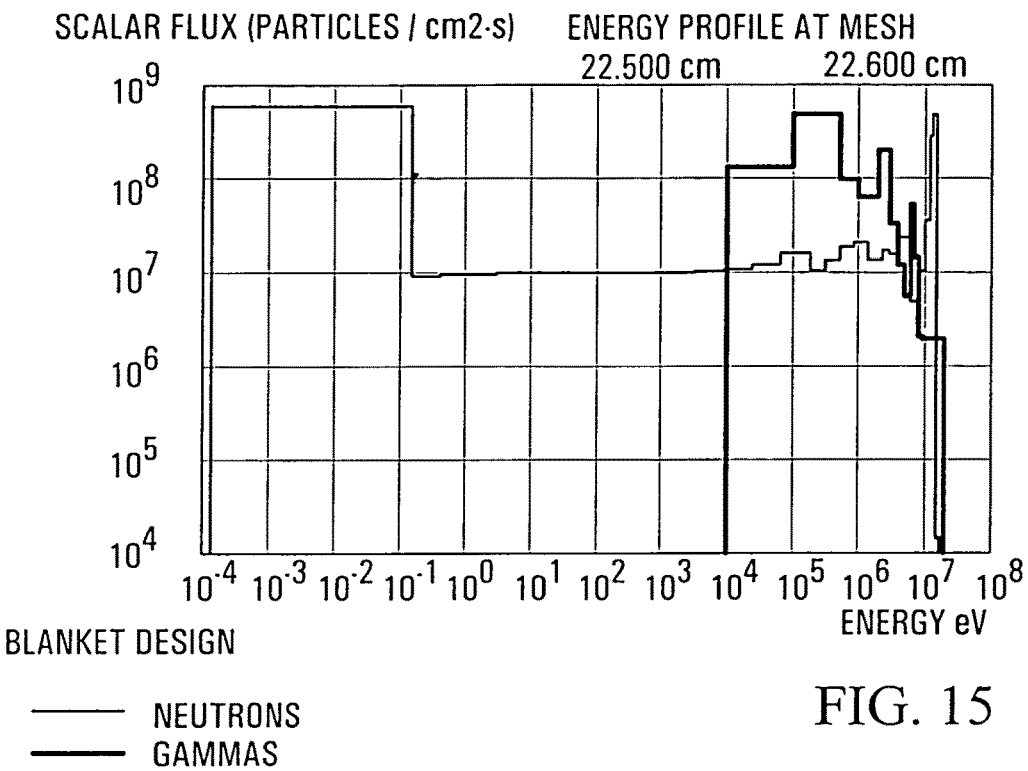
FIG. 15 shows a graph illustrating the profile of the scalar flux as a function of the particle energy at mesh 140 after the second wall of the nuclear fusion reactor assembly shown in FIGS. 10A and 10B.
Figure 16:
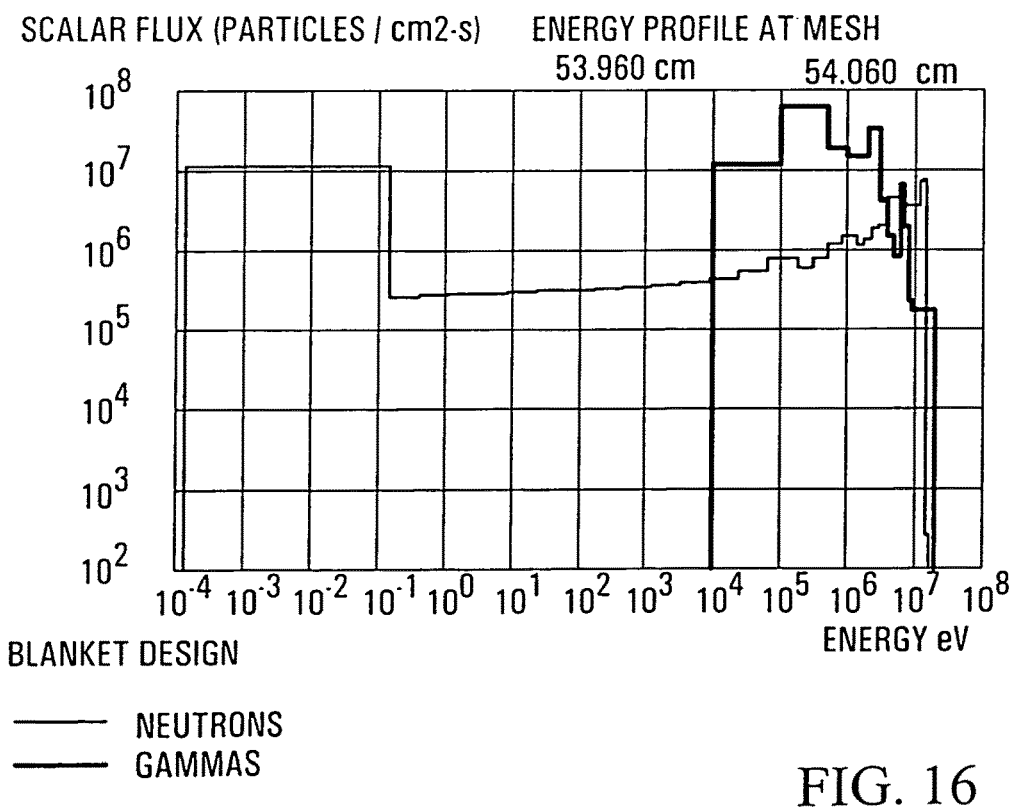
FIG. 16 shows a graph illustrating the profile of the scalar flux as a function of the particle energy at mesh 200 after the beryllium reflector of the fusion reactor assembly shown in FIGS. 10A and 10B.

FIGS. 13 to 15 show the neutron and gamma energy profiles at the following positions along the radius of the assembly: at the center of the sphere (FIG. 13), immediately after the plasma chamber wall (FIG. 14), after the inner chamber wall (FIG. 15), and after the beryllium reflector (FIG. 16).

From these graphs it appears that the 14.1 MeV neutrons are well absorbed by a relatively thin (30 cm) water shielding, their energy being deposited in the liquid. This energy can be used to heat steam and run an electric generator.

Energy Absorption/Conversion Apparatus

According to another aspect of the present invention, a heat source is configured with an energy conversion apparatus such that as much heat as possible from the heat source is converted into work and/or electrical energy. In one embodiment, parts of the energy conversion apparatus which are subjected to elevated temperatures by heat received from the heat source and/or heat generated by the conversion apparatus itself (e.g. through friction and/or vibration of mechanical parts and through electrical resistance (e.g. through Ohmic heating) and through electrical reactance are configured such that the heat absorbed by these parts is not lost from the system but directed back, for example into the medium used to convey heat from the heat source to the energy conversion apparatus, e.g. into a working fluid or a heat transfer fluid. The apparatus may further be arranged so that residual heat in a working fluid which has undergone a temperature drop in converting heat energy into mechanical work, is held within the system. In one embodiment, residual heat in the working fluid is returned to the system and increased by heat from the heat source. The heat may be returned by the working fluid or by another heat transfer fluid. In returning the heat back to the heat source, appropriate measures are taken to prevent heat escaping from the system by using for example heat reflective and/or heat insulative materials. It is to be noted that in this aspect of the invention, the heat source is not limited to a fusion reactor and may comprise any heat source, for example a heat source created by burning any fossil fuels or any other fuel, heat from other nuclear reactions, such as from a nuclear fission reactor or naturally occurring heat, such as geothermal heat or solar heat.

An example of a possible configuration of an energy conversion apparatus in which the heat source comprises a fusion reactor such as that described above will now be described with reference to FIG. 17.

An electric power generating plant is preferably configured such that the liquid blanket absorbs all energy released by the plasma generator (i.e. the capacitor and transmission line and any other parts of the energy source and transmission line from which heat may be transmitted) and by the plasma itself (bremsstrahlung, neutrons, heat, etc.) In one embodiment, the liquid blanket may act as a boiler. In order to convert to electricity almost all the thermal energy deposited in the liquid blanket, a possible embodiment of such a converted device is shown in FIG. 17.

Figure 17:
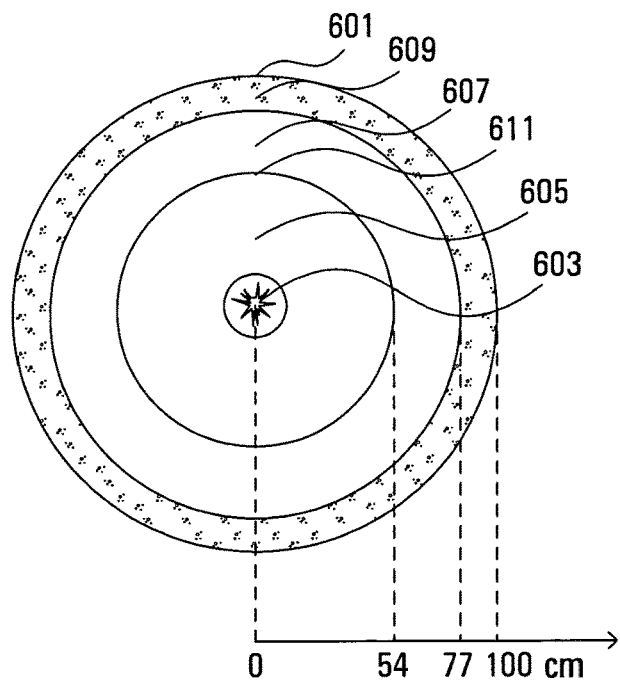
FIG. 17 shows a schematic diagram of a nuclear fusion reactor according to an embodiment of the present invention.

Referring to FIG. 17, an energy conversion apparatus shown generally at 601 comprises a central burning plasma 603 of for example deuterium-tritium (or any other suitable material), a neutron absorbing spherical layer 605 of water (or any other suitable liquid), a layer of superheated steam 607 for example at 400° C., and a covering layer of super insulator material 609. The energy conversion apparatus may further comprise a neutron reflector 611 comprising for example beryllium to reflect neutrons back into the layer of water 605 for further absorption and heat generation. The conversion apparatus may be surrounded by an environment having ambient temperature of for example 20° C. In one embodiment, the fusion reactor may have a configuration described above and shown in FIGS. 5 and 6 including the plasma chamber and the inner chamber enclosing the energy source, the transmission line and the fusion device.

Calculation of Heat Loss from the Energy Conversion Apparatus Shown in FIG. 17

Figure 18:
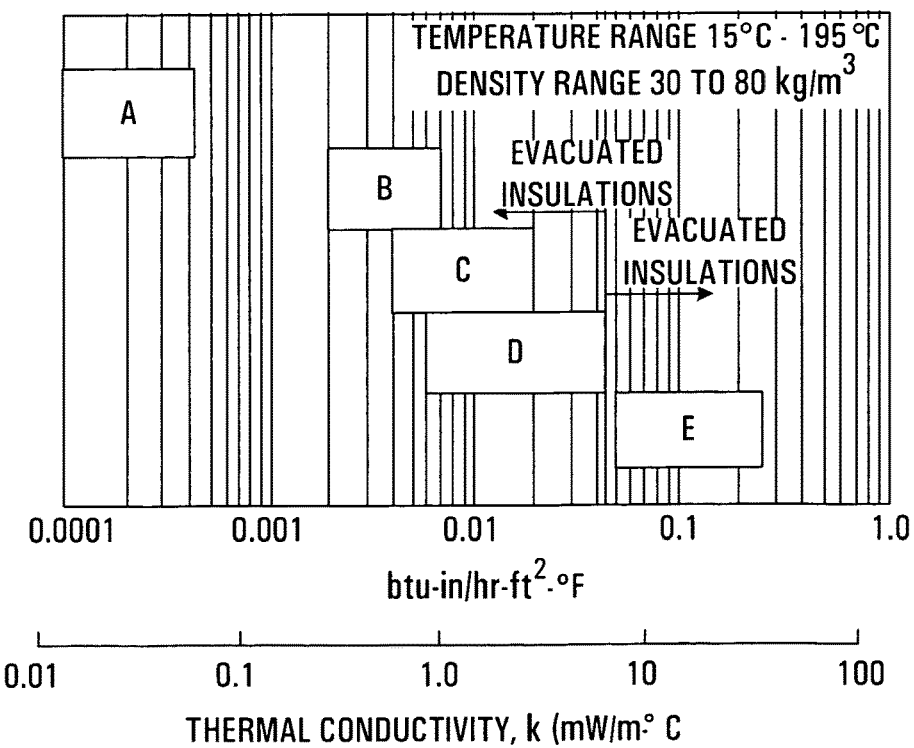
FIG. 18 shows a diagram illustrating the thermal conductivity of various insulating materials.

The rate of heat loss from a boiler having the configuration shown in FIG. 17 may be calculated as follows:

FIG. 18, reproduced from FIG. 1-7 of the book "Heat Transfer" by J. P. Holman (McGraw-Hill, New York 1981, p. 11), provides data on the thermal conductivity of various materials, including those of superinsulator type. This graph gives the thermal conductivity coefficient required to calculate the rate of heat loss C from the boiler. For a spherical geometry of the boiler, the formula to be used is the following: [Leonard R. Ingersoll, Otto J. Zobel, and Alfred C. Ingersoll, *Heat Conduction* (McGraw-Hill Book Company, New York, 1948), p. 38.]

$$C(r_1, r_2, T_1, T_2) = \frac{4\pi k r_1 r_2}{r_2 - r_1}(T_1 - T_2) \quad (20)$$

where $r_1$, $T_1$ are the radius and temperature, respectively, of the internal surface of the superinsulator, $r_2$, $T_2$ are the radius and temperature, respectively, of the external surface of the superinsulator in contact with the environment, and k is the thermal conductivity of the superinsulator. In one example of a specific embodiment of the conversion apparatus, $r_1$=77 cm=0.77 m, $T_1$=400° C., and $r_2$=100 cm=1.00 m, $T_2$=20° C. (ambient temperature). The thermal conductivity of the superinsulator will be conservatively chosen from FIG. 18 to be k=0.05 mW/m° C.=0.05×10$^{-3}$ W/m° C. Hence:

$$C(r_1, r_2, T_1, T_2) = \frac{4\pi \times 0.05 \cdot 10^{-3} \times 0.77 \times 1.00}{1.00 - 0.77}(400 - 20) = 0.799 \text{ Watts}$$

This shows that, with a good superinsulator material, the rate of heat loss can be dramatically low. Another important result is that this rate of heat loss is independent of the power generated in the boiler. In other words, irrespective of how many kilowatts or megawatts of power the boiler generates, the rate of heat loss remains the same, as long as $r_1$, $T_1$, $r_2$, $T_2$ are constant. This will normally be the case for steady state operation of the boiler.

Energy Conversion Apparatus

In order to convert the thermal energy available from the boiler to electricity, any suitable means may be used, for example one or more turbines, for example steam turbine(s) and/or one or more reciprocating devices. An example of a possible energy conversion apparatus will now be described with reference to FIG. 19.

Figure 19:
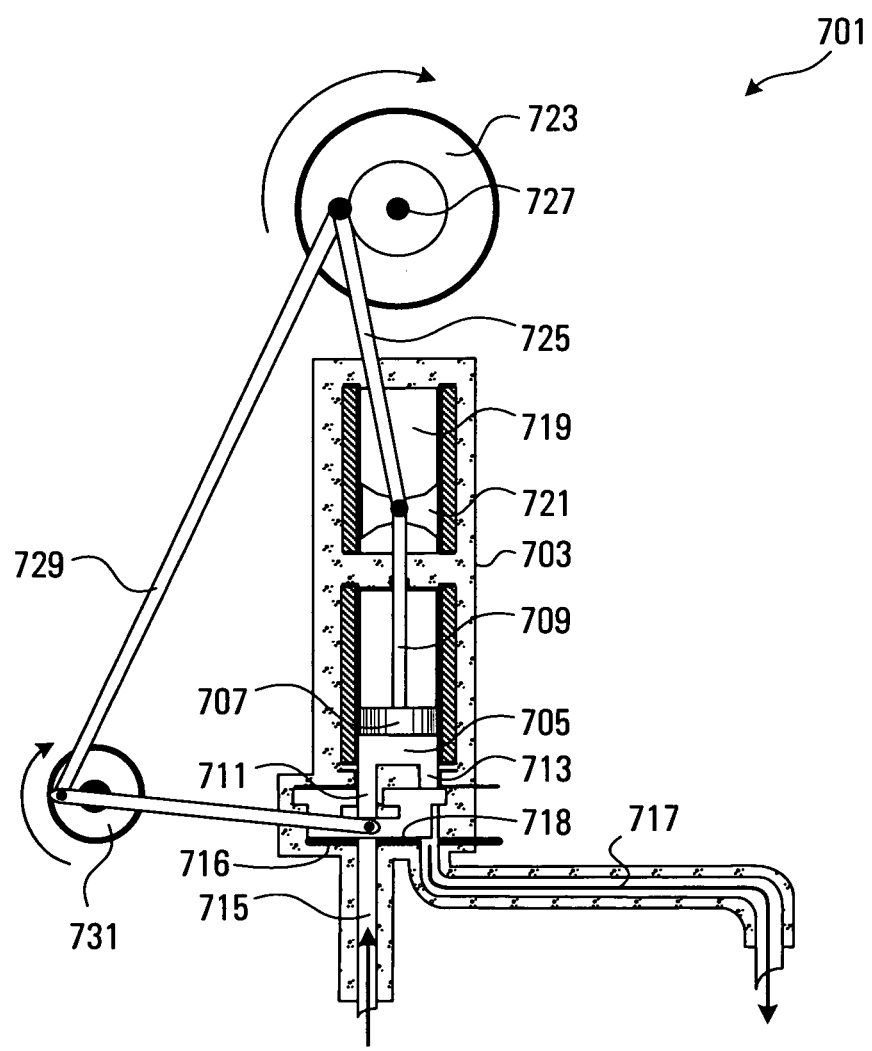
FIG. 19 shows a schematic diagram of a reciprocating engine according to an embodiment of another aspect of the present invention.

Referring to FIG. 19, an embodiment of a reciprocating engine for converting heat energy into mechanical energy, and generally shown at 701 comprises a body 703 defining a chamber 705, a piston 707 which can reciprocate in the chamber 705 and which is connected to a piston rod 709. The chamber is provided with a fluid inlet port 711 and a fluid exhaust port 713. The inlet port is arranged to receive working fluid fed through a conduit 715 under the control of a valve 716. An exhaust fluid conduit 717 is arranged to receive fluid exhausted from the chamber 705 through the exhaust port 713 under the control of a valve 718, which in the present embodiment may comprise a slide valve used to control both the injection of fluid into the chamber 705 and the exhaustion of fluid from the chamber 705, although in other embodiments any other valve system may be employed, including separate valve systems for the fluid inlet and fluid outlet.

The reciprocating engine further comprises a second chamber 719 for slidably receiving the piston rod 709 and containing a reciprocating piston rod guide 721 connected to the piston rod 709. A rotary fly wheel 723 is arranged to be rotatably driven by the engine via a main driving rod 725 which is connected between the guide 721 and to the fly wheel 723 at an eccentric position from the rotational axis 727 thereof. A valve driving mechanism 729, 731 is coupled to the fly wheel 723 for driving the valve 716, 718.

An example of an operating cycle of the engine proceeds as follows with steam as the working fluid. With the piston 707 at the low end of its stroke, the inlet valve 716 opens for steam intake. The piston begins to move upwardly, out of the chamber 705 and the inlet valve remains open until the piston 707 has completed, for example, about half of its upper run in the cylinder. During this time, steam is admitted from a boiler (e.g. from a boiler having a configuration of the one described above and shown in FIG. 17) and performs useful work of moving the piston. This phase is isothermal, the steam remaining substantially at the temperature at which it is admitted into the cylinder, e.g. the temperature of the boiler (e.g. 400° C.). The inlet valve closes as the piston reaches about the mid-point of its upward stroke and the steam expands adiabatically. The piston proceeds and reaches the top of its upward stroke where the permissible expansion of steam is complete. At about that time, the exhaust outlet valve opens and the expanded steam begins to be discharged through the exhaust outlet port 713. Part of the energy imparted to the fly wheel 723 during the upward stroke of the piston is returned to the piston during the downward stroke to assist in exhausting all the steam from the chamber. As soon as the piston reaches a position at or near the bottom of its stroke, the exhaust valve closes, the inlet valve opens to admit steam and a new cycle begins.

In this embodiment, the piston chamber is thermally insulated to substantially reduce heat losses to the surrounding environment so that heat to which the engine is subjected which is not converted into work energy is held within the system for further use. This arrangement advances the objective of minimizing heat losses in the entire system, including the energy conversion apparatus to maximize the value of parmater b defined above. In this embodiment, the working fluid inlet conduit 715 and the exhaust outlet conduit 717 are also thermally insulated. The thermal insulation used to minimize heat losses from the cylinder, the inlet and exhaust conduits are preferably of the same quality of super insulating material used for the boiler.

Figure 20:
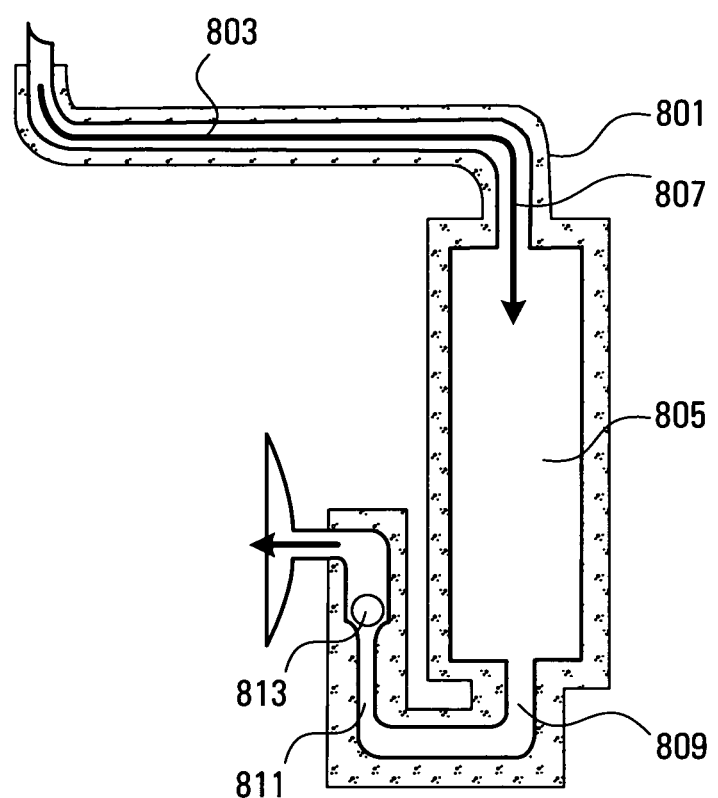
FIG. 20 shows a schematic diagram of an embodiment of a reservoir in accordance with another aspect of the present invention.

An example of an arrangement for returning working fluid from the energy conversion apparatus to the boiler in accordance with an embodiment of another aspect of the present invention is shown in FIG. 20.

Referring to FIG. 20, a working fluid return apparatus generally shown at 801 comprises a working fluid return conduit 803 connected to the exhaust system of an energy conversion apparatus, for example that described above and shown in FIG. 19, a reservoir chamber 805 having a working fluid inlet 807 connected to the exhaust conduit 803 and an outlet port 809. The apparatus further includes a working fluid return conduit 811 connected to the outlet port 809, for returning working fluid to the boiler (not shown) and a valve 813 for controlling the flow of working fluid from the reservoir 805 to the boiler. Preferably, at least part of at least one of the exhaust conduit 803, the reservoir 805 and the return conduit 811 are thermally insulated to assist in reducing heat loss from the working fluid to the surrounding environment during its passage from the energy conversion apparatus through the working fluid return apparatus. More preferably still, and as exemplified in FIG. 20, all parts of the exhaust conduit 803, the reservoir 805 and the return conduit 811 are thermally insulated and preferably insulated to the same or a similar standard as that of the boiler, which may be achieved by using the same or similar material(s).

An example of an operation of the return apparatus shown in FIG. 20, with steam as the working fluid, proceeds as follows:

The return apparatus 801 receives exhaust fluid from the energy conversion apparatus which passes through the exhaust conduit 803 and into the reservoir 805. The valve 813 at the boiler inlet controls the pressure at which the fluid in the reservoir is transferred to the boiler. As the energy conversion apparatus draws steam from the boiler, the steam pressure in the boiler gradually decreases. At the same time, exhaust steam from the energy conversion apparatus is accepted by the reservoir and the working fluid pressure in the reservoir increases. When a preset pressure in the reservoir is reached which exceeds the steam pressure in the boiler, the valve 813 opens and part of the reservoir steam is admitted into the boiler until the pressure in both the boiler and reservoir equalizes and the valve closes. An example of a power generating plant which includes the principals of heat recovery and reducing heat loss as described above, in which the heat source comprises a fusion device will now be described below.

Figure 21:
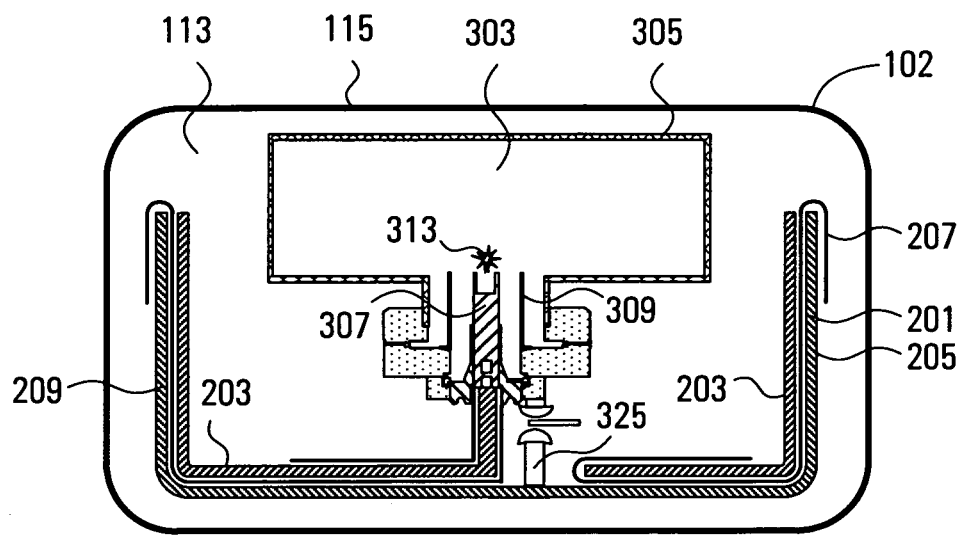
FIG. 21 shows a schematic diagram of an embodiment of a source of fusion energy in accordance with one aspect of the present invention.

In this embodiment, the source of energy is a fusion device which is similar to that shown in FIG. 9 and for convenience is reproduced as FIG. 21. Thus, the description relating to FIG. 9 applies equally to FIG. 21 and like parts are designated by the same reference numerals.

Figure 22:
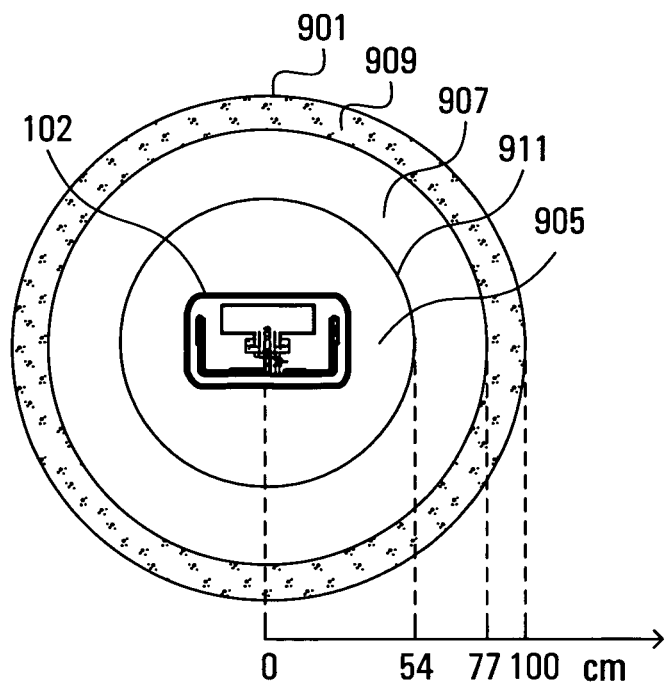
FIG. 22 shows a schematic diagram of an embodiment of a fusion apparatus in accordance with one aspect of the present invention.

FIG. 22 shows an example of an arrangement of a boiler, generally shown at 901, in which the plasma focus device 102 shown in FIGS. 9 and 21 is situated. Preferably, the plasma focus device is situated at or near the center of the boiler, as shown in FIG. 22. The boiler 901 is similar to that shown in FIG. 17 with the heat source 603 in that Figure comprising the plasma focus device 102 (FIGS. 21 and 22). Thus, the boiler includes a spherical layer of neutron absorbing fluid (e.g. water) 905 surrounded by a neutron reflecting layer 911 for example made of beryllium, a layer of super heated steam 907 all contained within an enclosure 909 whose wall includes a thermally insulating material preferably a super insulating material.

Figure 23:
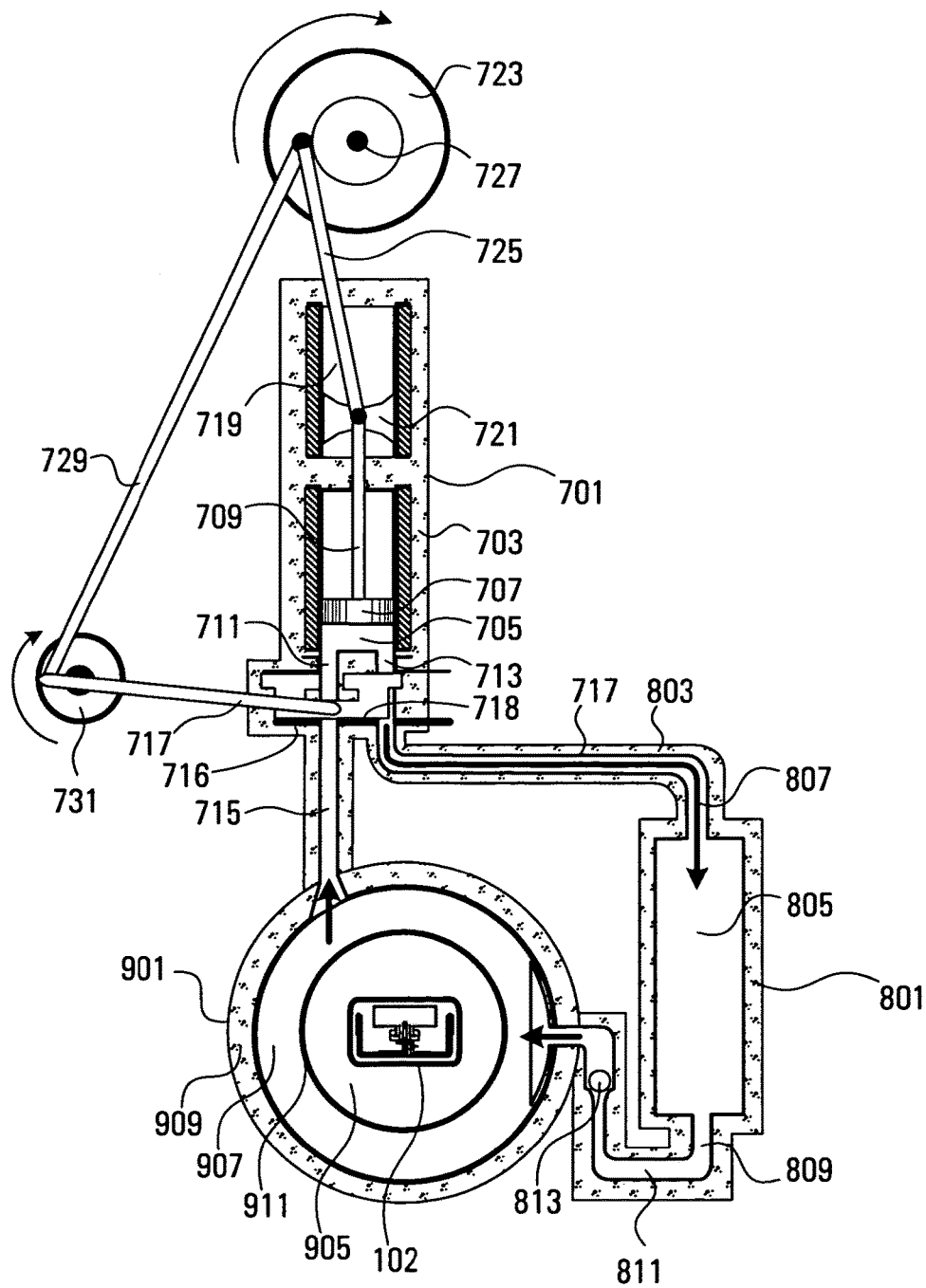
FIG. 23 shows a schematic diagram of a nuclear fusion apparatus comprising the components shown in FIGS. 19 to 22.

An example of a boiler and energy conversion apparatus is shown in FIG. 23. Referring to FIG. 23, the boiler 901 comprises a boiler similar to that shown in FIG. 22, coupled to an energy conversion apparatus 701 which is similar to that shown in FIG. 19. The assembly shown in FIG. 23 further includes an exhaust working fluid return apparatus 801 for returning exhaust working fluid from the conversion apparatus 701 to the boiler 901. The above description of the boiler, the conversion apparatus and the return apparatus described above in connection with FIGS. 17, 19, 20 and 22 apply equally to the respective components of the assembly shown in FIG. 23 and like parts are designated by the same reference numerals.

In another embodiment of an energy conversion assembly, the assembly includes an electrical generator coupled to the energy conversion apparatus for generating electrical energy, a part of which may be returned for driving the heat source, e.g. a fusion device, and any surplus may be used to supply electrical power to any one or more other devices. Preferably, the generator is arranged such that heat generated thereby in converting mechanical energy into electrical energy is held within the power generating system rather than lost to the environment. An example of such an arrangement in which an electrical generator is incorporated into the assembly described above and shown in FIG. 23 is shown in FIG. 24.

Figure 24:
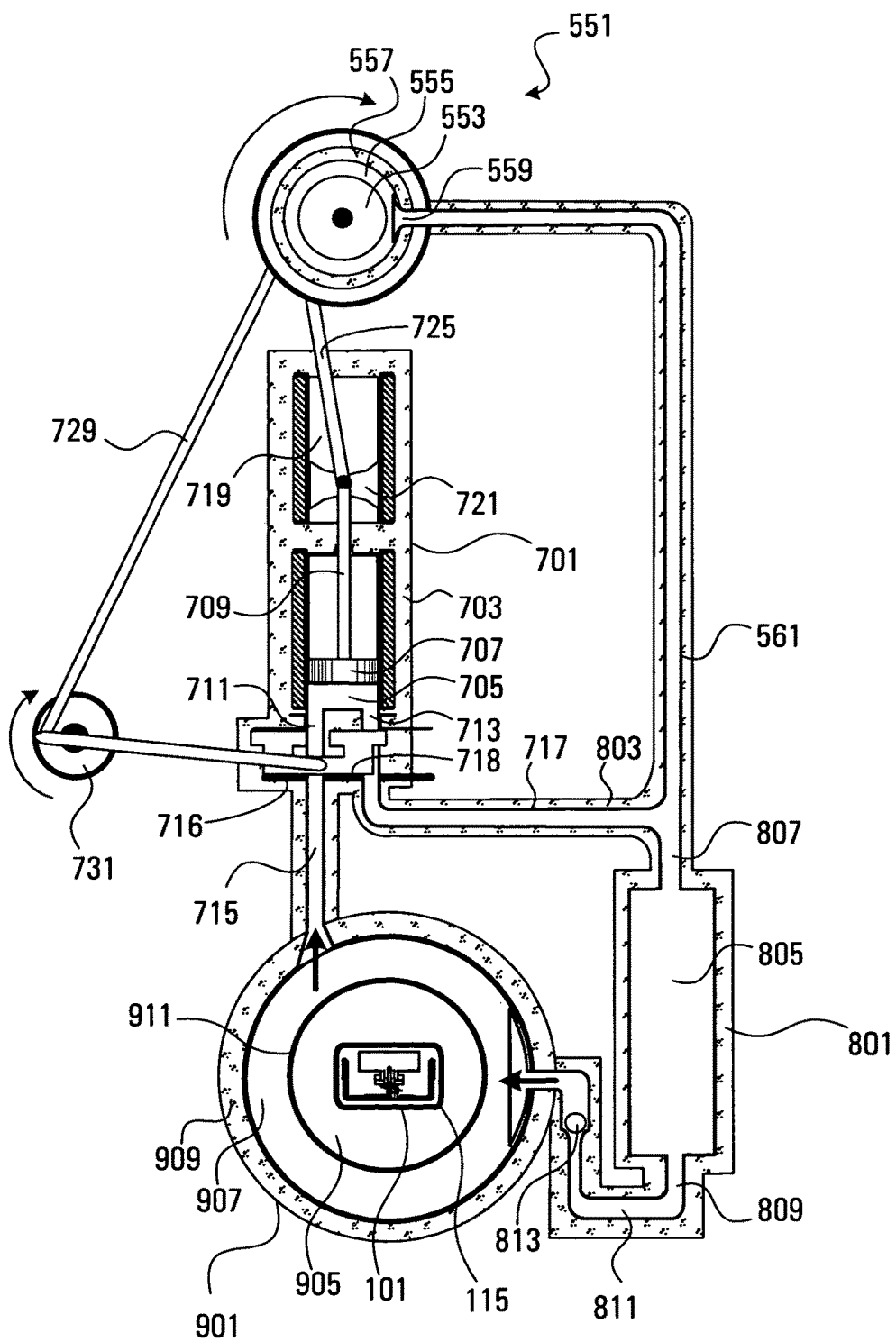
FIG. 24 shows a schematic diagram of another embodiment of a fusion apparatus according to one aspect of the present invention.

Referring to FIG. 24, the power generating plant, generally shown at 551, includes a boiler 901, an energy conversion apparatus 701 and an exhaust fluid return apparatus 801 similar to those shown in FIG. 23 and like parts are designated by the same reference numerals. In addition, the power generating plant 551 further includes an electric generator 553 coupled to be driven by the energy conversion apparatus 701. The electrical generator 553 is enclosed within a chamber 555 defined by a chamber wall 557. The chamber 555 includes a fluid inlet/outlet port 559 which is connected to the exhaust working fluid conduit 803 of the working fluid return apparatus 801 by a fluid feed conduit 561. In this embodiment, the wall 557 of the chamber 555 enclosing the electric generator 553 comprises a thermally insulative material which may provide the same standard of insulation as the insulating layer of the boiler 901. Similarly, the fluid feed conduit 561 is also thermally insulated and preferably to the same standard of insulation as the thermally insulating layer used for the boiler 901.

In operation, exhaust fluid from the energy conversion apparatus 701 is fed to the electric generator 553 through the fluid feed conduit 561. Heat generated by the electric generator during operation is absorbed into the exhaust fluid which conveys the heat into the boiler 901 via the return reservoir 805. In this way, heat generated by the electric generator 553 may be held within the system, recovered and converted into useful power.

First, by positioning the electric generator within the apparatus, surrounding the generator with exhaust working fluid and with a layer of for example high quality super insulator, the heat losses from this component of the system are largely recovered. As the temperature of the working fluid is relatively high, for example of the order of 300 to 400° C., the generator should be adapted to operate in an environment at these temperatures. Operating an electric generator in an environment at these elevated temperatures should be possible given that the Curie point for the magnets, when they lose their magnetization, is well above this temperature (Curie temperature 770° C. for iron, for instance, [*Encyclopedia Britannica*, Vol. 14, p. 600]) and the resistivity of wire does not change dramatically at this temperature. [*Smithsonian Physical Tables*, 1964, P. 393.]

Amount of Recirculating Power Required to Generate Enough Fusion Energy for Breakeven As described above, for energy breakeven, it is required that: 1) all energy used in the process of generation and heating of the plasma be recovered as heat in the liquid blanket, and 2) almost all thermal energy deposited in the liquid blanket be converted to electricity. Requirement 1) is a consequence of the fact that the parameter a must be equal to 1. Requirement 2) follows from the fact that the parameter b has to be larger than 0.99970. In other words, at least 99.97 percent of the thermal energy of the liquid blanket must be converted into electricity.

As far as requirement 1) is concerned, this is satisfied when for example, the source of energy e.g. fusion device is located within the boiler, as in our case. In this situation, the liquid layer will absorb all the energy released from the fusion device, and a will equal 1. As to requirement 2) the parameter b needs to have a value of the order of 99.97 percent. This parameter refers to the ability of converting the thermal energy into electrical energy, whereby in excess of 99.70 percent of the thermal energy is converted to electricity.

As described above, irrespective of how many kilowatts or megawatts of heat are deposited in the boiler, always the same amount of heat is lost out of the boiler. This loss, though unavoidable, is fortunately small, and the fusion device must be able to generate, for breakeven, at least the power lost. In the following section, the numbers of times per second an example of a fusion device must be operated in order to have that power output is calculated, and examples of the calculated values are given in Table 2 below.

TABLE 2

| Thermal Coefficient of Superinsulator (W/m·°C.) (1) | Radius of Inner Sphere (m) (2) | Radius of Outer Sphere (m) (3) | Temperature of Inner Sphere (°C.) (4) | Temperature of Outer Sphere (°C.) (5) | Rate of Heat Loss (W) (6) | Number of Reactions per Second Required for Breakeven (7) | Frequency of Operation of a 100 J Plasma Focus Required for Breakeven (kHZ) (8) | 2 × Rate of Heat Loss (W) (9) | Number of Reactions per Second Required for Breakeven (10) | Frequency of Operation of a 100 J Plasma Focus Required for Breakeven (kHZ) (11) | 3 × Rate of Heat Loss (W) (12) | Number of Reactions per Second Required for Breakeven (12) | Frequency of Operation of a 100 J Plasma Focus Required for Breakeven (kHZ) (13) |
|---|---|---|---|---|---|---|---|---|---|---|---|---|---|
| 1.00E−05 | 0.77 | 1.00 | 300 | 20 | 0.118 | 4.18E+10 | 2.73 | 0.236 | 8.35E+10 | 5.46 | 0.353 | 1.25E+11 | 8.19 |
| 2.00E−05 | 0.77 | 1.00 | 300 | 20 | 0.236 | 8.35E+10 | 5.46 | 0.471 | 1.67E+11 | 10.92 | 0.707 | 2.51E+11 | 16.38 |
| 3.00E−05 | 0.77 | 1.00 | 300 | 20 | 0.363 | 1.25E+11 | 8.19 | 0.707 | 2.51E+11 | 16.38 | 1.060 | 3.76E+11 | 24.57 |
| 4.00E−05 | 0.77 | 1.00 | 300 | 20 | 0.471 | 1.67E+11 | 10.92 | 0.942 | 3.34E+11 | 21.84 | 1.414 | 5.01E+11 | 32.76 |
| 5.00E−05 | 0.77 | 1.00 | 300 | 20 | 0.589 | 2.09E+11 | 13.65 | 1.178 | 4.18E+11 | 27.30 | 1.767 | 6.27E+11 | 40.95 |
| 6.00E−05 | 0.77 | 1.00 | 300 | 20 | 0.707 | 2.51E+11 | 16.38 | 1.414 | 5.01E+11 | 32.76 | 2.120 | 7.52E+11 | 49.14 |
| 1.00E−05 | 0.77 | 1.00 | 400 | 20 | 0.160 | 5.67E+10 | 3.71 | 0.320 | 1.13E+11 | 7.41 | 0.480 | 1.70E+11 | 11.12 |
| 2.00E−05 | 0.77 | 1.00 | 400 | 20 | 0.320 | 1.13E+11 | 7.41 | 0.639 | 2.27E+11 | 14.82 | 0.959 | 3.40E+11 | 22.23 |
| 3.00E−05 | 0.77 | 1.00 | 400 | 20 | 0.480 | 1.70E+11 | 11.12 | 0.959 | 3.40E+11 | 22.23 | 1.439 | 5.10E+11 | 33.35 |
| 4.00E−05 | 0.77 | 1.00 | 400 | 20 | 0.639 | 2.27E+11 | 14.82 | 1.279 | 4.54E+11 | 29.64 | 1.918 | 6.80E+11 | 44.46 |
| 5.00E−05 | 0.77 | 1.00 | 400 | 20 | 0.799 | 2.83E+11 | 18.53 | 1.599 | 5.67E+11 | 37.05 | 2.398 | 8.50E+11 | 55.58 |
| 6.00E−05 | 0.77 | 1.00 | 400 | 20 | 0.959 | 3.40E+11 | 22.23 | 1.918 | 6.80E+11 | 44.46 | 2.878 | 1.02E+12 | 66.69 |
| 1.00E−05 | 0.77 | 1.00 | 500 | 20 | 0.202 | 7.16E+10 | 4.68 | 0.404 | 1.43E+11 | 9.36 | 0.606 | 2.15E+11 | 14.04 |
| 2.00E−05 | 0.77 | 1.00 | 500 | 20 | 0.404 | 1.43E+11 | 9.36 | 0.808 | 2.86E+11 | 18.72 | 1.212 | 4.30E+11 | 28.08 |
| 3.00E−05 | 0.77 | 1.00 | 500 | 20 | 0.606 | 2.15E+11 | 14.04 | 1.212 | 4.30E+11 | 28.08 | 1.817 | 6.44E+11 | 42.12 |
| 4.00E−05 | 0.77 | 1.00 | 500 | 20 | 0.808 | 2.86E+11 | 18.72 | 1.615 | 5.73E+11 | 37.44 | 2.423 | 8.59E+11 | 56.16 |
| 5.00E−05 | 0.77 | 1.00 | 500 | 20 | 1.010 | 3.58E+11 | 23.40 | 2.019 | 7.16E+11 | 46.80 | 3.029 | 1.07E+12 | 70.20 |
| 6.00E−05 | 0.77 | 1.00 | 500 | 20 | 1.212 | 4.30E+11 | 28.08 | 2.423 | 8.59E+11 | 56.16 | 3.635 | 1.29E+12 | 84.25 |

$$C(r_1, r_2, T_1, T_2) = \frac{4\pi k r_1 r_2}{r_2 - r_1}(T_1 - T_2)$$

Since the power lost is a function of various parameters, such as thermal conductivity of the superinsulator, radius of the boiler, etc., as prescribed by Eq. (20), in Table 2 a few combinations of these parameters have been listed and used to calculate the rate of heat loss C from the boiler (Eq. 20 is reproduced at the bottom of the Table for convenience). In column (1) of the Table various thermal conductivity coefficients have been listed, ranging from $1 \times 10^{-5}$ to $6 \times 10^{-5}$ W/m·°C., as taken from FIG. 18. Each set is then used in a range of steam temperatures from 300 to 500° C., as listed in column (4). The results of the calculation are shown in column (6), which therefore gives the rate of heat loss in watts for each combination of the listed parameters.

In order now to calculate the number of reactions per second required from the fusion device for breakeven, i.e., to compensate for this rate of heat loss, from Eq. 4 each reaction releases $2.82 \times 10^{-12}$ joules of energy. Hence, the numbers in column (6) must be divided by this number. The result is reported in column (7).

Lastly, in order to determine the number of times per second the fusion device must operate in order to produce the above reactions, from Table 1, a 100 joules plasma focus is able to produce $1.53 \times 10^7$ reactions per discharge. Hence, the numbers in column (7) are divided by this number in order to obtain the number of discharges per second (in Hz). Column (8) reports the frequency in kilohertz.

All the calculations so far have been carried out on the assumption that only the boiler loses heat. Although it is true that the largest part of the heat losses occurs from this component of the system with the highest temperature, other losses occur in other places. For instance, losses occur also from the electric generator used to recharge the fusion device, but such losses can be largely recovered via an arrangement like that described above and shown in FIG. 24.

The overall heat losses from the system could be precisely calculated, were its geometry precisely known. FIG. 24 shows a possible but not the only geometry. Other geometries are possible. Although this Figure shows that the main losses occur from the boiler, additional losses arise in other components of the system, and these must also be taken into account. Table 2 considers two additional general cases, namely, when the overall heat losses are estimated to be twice as much as those of the boiler, and when they are three times. Correspondingly, the operating regime of the fusion device is calculated and the results reported in columns (11) and (13), respectively, for these additional cases.

The numbers provided in Table 2 for the operating frequency of a Plasma Focus device as a function of the rate of heat loss allows the characteristics of an electric generator system capable of driving the Plasma Focus at that operating frequency to be found.

In the following, an electric generator driven by a reciprocating engine that converts the thermal energy contained in the steam in the boiler into mechanical energy of rotation of the generator's shaft.

Table 3 provides a detailed analysis of the reciprocating engine performance. This Table provides a detailed analysis of the history of the steam in both in the boiler and the condenser. Some of the formulas used in the Table are explained immediately after Table 3.

The analysis has been done for a typical set of parameters of a reciprocating engine as these evolve from cycle to cycle. Of the various possibilities listed in Table 2, the chosen typical set of parameters is the following: thermal coefficient of the superinsulator=$5 \times 10^{-5}$ W/m.° C.; temperature of the boiler inner sphere=400° C.; overall losses from the system equal to three times the losses from the boiler (=1.937 W). For these parameters, the operating frequency of the 100 joules Plasma Focus is 55.58 kHz. The electric generator should therefore be able to generate 5,558 kilowatts of power to feed the 100 joules Plasma Focus (55.58 kHz×100 J=5,558 kW). This is the power that needs to be recirculated in the system in order to generate enough fusion energy for breakeven. An initial additional parameter that is required in the calculations is the steam pressure in the boiler, which, for the purpose of this example is 60 bars.

TABLE 3A

History of steam in boiler and condenser.

| Row No. | Inner Sphere Radius (m) 1 | Volume of Inner Sphere (m³) 2 | Shell Thickness of Volume of Saturated Steam (m) 3 | Outer Sphere Radius (m) 4 | Outer Sphere Volume (m³) 5 | Difference of Volume of Outer and Inner Sphere = Initial Volume of Steam (m³) 6 | Radius of Piston (m) 7 |
|---|---|---|---|---|---|---|---|
| 2 | 0.54 | 0.66 | 0.23 | 0.77 | 1.91 | 1.25 | 0.20 |
| 3 | 0.54 | 0.66 | 0.23 | 0.77 | 1.91 | 1.25 | 0.20 |
| 4 | 0.54 | 0.66 | 0.23 | 0.77 | 1.91 | 1.25 | 0.20 |
| 5 | 0.54 | 0.66 | 0.23 | 0.77 | 1.91 | 1.25 | 0.20 |
| 6 | 0.54 | 0.66 | 0.23 | 0.77 | 1.91 | 1.25 | 0.20 |

TABLE 3B

| Row No. | Height of Piston (m) 8 | Volume of Piston (m³) 9 | Radius of Expansion Chamber (Condenser) (m) 10 | Height of Expansion Chamber (Condenser) (m) 11 | Volume of Expansion Chamber (Condenser) (m³) 12 | First Expansion Volume in Piston (m³) 13 | Adiabatic Expansion Volume in Piston (m³) 14 | Pressure in Initial Volume of Steam (bar) 15 |
|---|---|---|---|---|---|---|---|---|
| 1 | 0.80 | 0.10 | 0.20 | 1.00 | 0.13 | 0.05 | 0.05 | 60.0 |
| 2 | 0.80 | 0.10 | 0.20 | 1.00 | 0.13 | 0.05 | 0.05 | 58.0 |
| 3 | 0.80 | 0.10 | 0.20 | 1.00 | 0.13 | 0.05 | 0.05 | 56.0 |
| 4 | 0.80 | 0.10 | 0.20 | 1.00 | 0.13 | 0.05 | 0.05 | 55.0 |

TABLE 3B-continued

| Row No. | Height of Piston (m) 8 | Volume of Piston (m³) 9 | Radius of Expansion Chamber (Condenser) (m) 10 | Height of Expansion Chamber (Condenser) (m) 11 | Volume of Expansion Chamber (Condenser) (m³) 12 | First Expansion Volume in Piston (m³) 13 | Adiabatic Expansion Volume in Piston (m³) 14 | Pressure in Initial Volume of Steam (bar) 15 |
|---|---|---|---|---|---|---|---|---|
| 5 | 0.80 | 0.10 | 0.20 | 1.00 | 0.13 | 0.05 | 0.05 | 55.0 |
| 6 | 0.80 | 0.10 | 0.20 | 1.00 | 0.13 | 0.05 | 0.05 | 55.0 |

TABLE 3C

| Row No. | Temperature of Superheated Steam in Initial Volume of Steam (° C.) 16 | Saturation Temperature (° C) 17 | Specific Volume (m³/kg) 18 | Total Mass of Superheated Steam (kg) 19 | Volume of Steam Plus First Expansion Volume in Piston (m³) 29 | Specific Volume of Steam after First Expansion in Piston (m³/kg) 21 | Pressure of Steam after First Expansion in Piston (bar) 22 |
|---|---|---|---|---|---|---|---|
| 1 | 400 | 275.64 | 0.04739 | 26.43 | 1.31 | 0.04937 | 58.0 |
| 2 | 400 | 273.43 | 0.04937 | 25.38 | 1.31 | 0.05143 | 56.0 |
| 3 | 400 | 271.17 | 0.05143 | 24.36 | 1.31 | 0.05357 | 54.0 |
| 4 | 400 | 270.02 | 0.05214 | 24.02 | 1.31 | 0.05432 | 53.0 |
| 5 | 400 | 270.02 | 0.05214 | 24.02 | 1.31 | 0.05432 | 53.0 |
| 6 | 400 | 270.02 | 0.05214 | 24.02 | 1.31 | 0.05432 | 53.0 |

TABLE 3D

| Row No. | Work Done in the Initial Isothermal Expansion in Piston (kJ) 23 | Mass of Steam in Piston before Adiabatic Expansion (kg) 24 | Internal Energy of steam (kJ/kg) 25 | Total Internal Energy of Steam in Piston before Adiabatic Expansion (kJ) 26 | Entropy of Superheated Steam (kJ/kg.K) 27 | Specific Volume of Steam after Full Adiabatic Expansion in Entire Piston (m³/kg) 28 | Temperature of Steam after Full Expansion in Entire Piston (° C.) 29 |
|---|---|---|---|---|---|---|---|
| 1 | 335.64 | 1.06 | 2,895.6 | 3,066.20 | 6.5607 | 0.09494 | 280 |
| 2 | 322.20 | 1.02 | 2,898.4 | 2,946.22 | 6.5811 | 0.09890 | 280 |
| 3 | 309.29 | 0.98 | 2,901.2 | 2,830.93 | 6.6021 | 0.10303 | 280 |
| 4 | 305.04 | 0.96 | 2,902.5 | 2,793.28 | 6.6128 | 0.10446 | 280 |
| 5 | 305.04 | 0.96 | 2,902.5 | 2,793.28 | 6.6128 | 0.10446 | 280 |
| 6 | 305.04 | 0.96 | 2,902.5 | 2,793.28 | 6.6128 | 0.10446 | 280 |

TABLE 3E

| Row No. | Pressure of Steam after Full Expansion in Entire Piston (bar) 30 | Internal Energy of Steam after Adiabatic Expansion in Entire Piston (kJ/kg) 31 | Total Internal Energy of Steam After Adiabatic Expansion (kJ) 32 | Work Done in the Adiabatic Expansion in Piston (kJ) 33 | Total Work Done by the Expansion of Steam in Piston (kJ) 34 | Specific Volume of Steam in Piston and Condenser after Adiabatic Expansion in Condenser and Before Being Compressed in Condenser (m³/kg) 35 |
|---|---|---|---|---|---|---|
| 1 | 25.0 | 2,723.5 | 2,883.96 | 182.24 | 517.88 | 0.21361 |
| 2 | 24.0 | 2,726.2 | 2,771.18 | 175.04 | 497.24 | 0.10899 |
| 3 | 23.0 | 2,728.8 | 2,622.71 | 168.22 | 477.51 | 0.07413 |
| 4 | 22.5 | 2,730.01 | 2,627.37 | 165.91 | 470.95 | 0.06707 |
| 5 | 22.5 | 2,730.01 | 2,627.37 | 165.91 | 470.95 | 0.06707 |
| 6 | 22.5 | 2,730.01 | 2,627.37 | 165.91 | 470.95 | 0.06707 |

TABLE 3F

| Row No. | Internal Energy of Steam after Adiabatic Expansion in Condenser and Before Being Compressed in Condenser (kJ/kg) 36 | Total Internal Energy of Steam in Piston and Condenser before being Compressed in Condenser in Case of No Steam Transfer to the Boiler (kJ) 37 | Total Internal Energy of Steam in Piston and Condenser before being Compressed in Condenser in Case of Steam Transfer to the Boiler (kJ) 38 | Temperature of Steam after Adiabatic Expansion in Condenser and Before Being Compressed in Condenser (° C.) 39 | Pressure of Steam after Adiabatic Expansion in Condenser and Before Being Compressed in Condenser (bar) 40 |
|---|---|---|---|---|---|
| 1 | 2,561.3 | 2,712.20 | — | 165 | 8.6 |
| 2 | 2,713.8 | 5,632.26 | — | 270 | 21.5 |
| 3 | 2,815.6 | 8,590.94 | 6,785.94 | 340 | 35.5 |
| 4 | 2,844.1 | — | 6,854.62 | 360 | 41.0 |
| 5 | 2,844.1 | — | 6,854.62 | 360 | 41.0 |
| 6 | 2,844.1 | — | 6,854.62 | 360 | 41.0 |

TABLE 3G

| Row No. | Specific Volume of Steam after being Compressed in Condenser in Case of No Steam Transfer to the Boiler (m³/kg) 41 | Temperature of Steam after being Compressed in Condenser in Case of No Steam Transfer to the Boiler (° C.) 42 | Pressure of Steam after Compressed in Condenser in Case of No Steam Transfer to the Boiler (bar) 43 | Pressure of Steam in Condenser after Adiabatic Expansion in Main Chamber and before Restarting the Cycle (bar) 44 | Temperature of Steam in Condenser after Adiabatic Expansion in Main Chamber and before Restarting the Cycle (° C.) 45 |
|---|---|---|---|---|---|
| 1 | 0.11867 | 245 | 18.5 | 18.5 | — |
| 2 | 0.06055 | 370 | 45.0 | 45.0 | — |
| 3 | 0.04119 | 450 | 74.0 | 56.0 | 410 |
| 4 | — | — | — | 56.0 | 410 |
| 5 | — | — | — | 56.0 | 410 |
| 6 | — | — | — | 56.0 | 410 |

TABLE 3H

| Row No. | Steam Volume of Steam in Condenser after Adiabatic Expansion in Main Chamber and before Restarting the Cycle (m³/kg) 46 | Total Mass of Superheated Steam in Condenser before Expansion in Main Chamber (kg) 47 | Total Mass of Superheated Steam Left in Condenser after Expansion in Main Chamber (kg) 48 | Total Mass of Superheated Steam Transferred from Condenser into Main Chamber (kg) 49 | Internal Energy of Steam after being Compressed in Condenser (kJ/kg) 50 | Total Internal Energy of Steam after being Compressed in Condenser (kJ) 51 |
|---|---|---|---|---|---|---|
| 1 | — | — | — | — | 2,674.8 | 2,832.39 |
| 2 | — | — | — | — | 2,856.8 | 5,929.04 |
| 3 | 0.05214 | 3.05 | 2.41 | 0.64 | — | — |
| 4 | 0.05214 | 3.37 | 2.41 | 0.96 | — | — |
| 5 | 0.05214 | 3.37 | 2.41 | 0.96 | — | — |
| 6 | 0.05214 | 3.37 | 2.41 | 0.96 | — | — |

TABLE 3I

| Row No. | Internal Energy of Steam after Adiabatic Expansion in Main Chamber and before Restarting the Cycle (kJ/kg) 52 | Total Internal Energy of Steam after Adiabatic Expansion in Main Chamber in Case of Steam Transfer to the Boiler and before Restarting the Cycle (kJ) 53 | Work Done by Piston in Compressing Steam in Condenser (kJ) 54 | Net Work Done in One Full Cycle of Piston Run (kJ) 55 | Number of Cycles of Piston per Second for a 5.558 MJ/sec (=5.558 MW) Electric Generator 56 | Number of Cycles of Piston per Minute for a 5.558 MJ/sec (=5.558 MW) Electric Generator 57 |
|---|---|---|---|---|---|---|
| 1 | — | — | 120.19 | 397.69 | 13.98 | 838.53 |
| 2 | — | — | 296.78 | 200.45 | 27.73 | 1663.62 |
| 3 | 2,917.7 | 7,032.01 | 246.07 | 231.44 | 24.01 | 1440.88 |
| 4 | 2,917.7 | 7,032.01 | 177.38 | 293.57 | 18.93 | 1135.95 |
| 5 | 2,917.7 | 7,032.01 | 177.38 | 293.57 | 18.93 | 1135.95 |
| 6 | 2,917.7 | 7,032.01 | 177.38 | 293.57 | 18.93 | 1135.95 |

Notes to Table 3

Note No. 1

The formula for the work done by the steam in the isothermal process of initial expansion in the piston [$\Delta W = RT_1 \ln(v_2/v_1)$, where $R = 461.48$ J/kg·° K, $v_1$ and $v_2$ are the specific volumes before and after expansion, respectively] is taken from "Steam Turbines and Their Cycles" (Robert E. Krieger Publishing Company, Huntington, N.Y., 1974) by J. Kenneth Salisbury, pp. 17-18. This considers an ideal gas or steam. Our steam can be considered ideal because the compressibility factor is ~1 at the pressures we are dealing with [~40 bar—see FIG. 3-12 in "Thermodynamics for Engineers" (John Wiley & Sons, New York, 1983] by Jesse S. Doolittle and Francis J. Hale, p. 65).

Note No. 2

In an adiabatic expansion, the work done is equal to the change in internal energy of the steam (from "Steam Turbines and Their Cycles" (Robert E. Krieger Publishing Company, Huntington, N.Y., 1974) by J. Kenneth Salisbury, pp. 17).

Note No. 3

The work done by the piston in compressing the steam in the condenser is calculated as follows. First, it is assumed that the steam will expand by itself from the piston in the condenser volume (which is considered to be evacuated at the beginning) until the pressure is equal everywhere. At this point, the specific volume of the steam is calculated and, since it is an adiabatic expansion, and we know the entropy, which is the same as before, we derive from the tables the specific internal energy. Then we calculate the specific volume after the piston has compressed the steam in the condenser, and we derive the specific internal energy from the steam tables. The difference between the two total internal energies (i.e., specific internal energies multiplied by the mass of steam) gives the work done by the piston. The reason for this is that, assuming the opposite phenomenon to occur, i.e., adiabatic expansion of the steam from the condenser into the piston chamber, against the piston, this would be the work done on the piston.

Note No. 4

The volume of the piston has been divided in two equal parts: the first for the isothermal expansion of the steam, and the other for the adiabatic expansion. Since the sliding valve will not close abruptly midway in the run of the piston, we have allowed some extra run for the piston (=0.02 times the volume of piston) to take into account this additional expansion.

Note No. 5

In using the "Steam Tables" (J. H. Keenan, F. G. Keyes, P. G. Hill, and J. G. Moore, Wiley, New York, 1969), we did not interpolate, but rather used the closest values of the parameters in order to derive new values of other paremeters from the Tables.

Note No. 6

In all adiabatic or isentropic processes considered in the analysis of the reciprocating engine, the entropy per unit weight per unit degree of temperature has been taken as a constant. Example 9-8 confirms this at p. 198 of "Thermodynamics for Engineers" (Jesse S. Doolittle, and Francis J. Hale, John Wiley & Sons, New York, 1983).

Table 3 is self-explanatory. However, for added clarity, each row and column, as well as the calculations that have been done, and the results obtained are explained below.

First Row

Column 1 reports the radius R of the inner sphere delimited by the beryllium neutron reflector. The radius is 54 cm, as used in FIG. 11 to calculate the neutron attenuation by the water blanket.

Column 2 reports the calculation of the volume of the inner sphere:

$$V_{in} = (4/3)\pi R^3.$$

Column 3 reports the thickness of the spherical shell containing the saturated steam between the beryllium reflector and the superinsulator.

Column 4 reports the radius $R_{out}$ of the outer sphere.

Column 5 calculates the volume of the outer sphere:

$$V_{out} = (4/3)\pi R_{out}^3.$$

Column 6 calculates the difference between the previous two spherical volumes. It is the volume of the spherical shell containing the steam.

Column 7 reports the radius r of the cylinder containing the piston of the reciprocating engine.

Column 8 reports the height h of the cylinder of the reciprocating engine, i.e., the length of the piston stroke.

Column 9 calculates the volume of the piston:

$$V_{piston} = \pi r^2 \cdot h.$$

Column 10 reports the radius $r_{exp}$ of the expansion chamber (condenser).

Column 11 reports the height $h_{exp}$ of the expansion chamber (condenser).

Column 12 calculates the volume of the expansion chamber:

$$V_{exp} = \pi r_{exp}^2 h_{exp}.$$

Column 13 calculates the volume of that part of the cylinder where the expansion of the piston is considered to be isothermal. The volume has been chosen to be one half the total volume of the piston.

Column 14 calculates the volume of the cylinder where the steam expands adiabatically after the initial isothermal expansion. This volume is in the upper part of the cylinder.

Column 15 reports the pressure of the initial volume of steam. This number has been chosen to be 60 bars.

Column 16 specifies the assigned value of the steam temperature in the initial volume. This number has been chosen to be 400° C.

Column 17 reports the value of the steam saturation temperature, as found from the 'Steam Tables' [J. H. Keenan, F. G. Keyes, P. G. Hill, and J. G. Moon, Steam Tables, (Wiley, New York, 1969).], as a function of steam pressure (column 15) and temperature (column 16).

Column 18 reports the steam specific volume, as found from the 'Steam Tables' [J. H. Keenan, F. G. Keyes, P. G. Hill, and J. G. Moon, Steam Tables, (Wiley, New York, 1969).], as a function of steam pressure (column 15) and temperature (column 16).

Column 19 calculates the total mass of the superheated steam in the boiler by dividing the steam volume given by column 6 by the specific volume of column 18.

Column 20 calculates the volume sum of the initial volume of the steam in the boiler and the portion of the piston volume where the steam will expand isothermally.

Column 21 calculates the new specific volume of the steam after its isothermal expansion in the piston by dividing the steam volume given by column 20 by the steam mass of column 19.

Column 22 reports the steam pressure after its isothermal expansion in piston, as found from the 'Steam Tables' [J. H. Keenan, F. G. Keyes, P. G. Hill, and J. G. Moon, Steam Tables, (Wiley, New York, 1969).], as a function of temperature (column 16) and specific volume (column 18)

Column 23 reports the work done on the piston during the initial isothermal expansion of the steam. The formula for the work done by the steam [$\Delta W = RT_1 \ln(v_2/v_1)$, where $R = 461.48$ J/kg° K, $v_1$ and $v_2$ are the specific volumes before and after expansion, respectively] is taken from "Steam Turbines and Their Cycles" by J. Kenneth Salisbury (Robert E. Krieger Publishing Company, Huntington, N.Y., 1950), pp. 17-18. This considers an ideal gas or steam. In our case, the steam can be considered ideal because the compressibility factor is ~1 at the pressures we are dealing with (~60 bars—see FIG. 3-12 in "Thermodynamics for Engineers" by Jesse S. Doolittle and Francis J. Hale, John Wiley & Sons, New York, p. 65).

Column 24 calculates the mass of the superheated steam in the piston by dividing the volume given by column 13 by the steam specific volume of column 21.

Column 25 reports the internal energy of the steam, as found from the 'Steam Tables' [J. H. Keenan, F. G. Keyes, P. G. Hill, and J. G. Moon, *Steam Tables*, (Wiley, New York, 1969).], as a function of temperature (column 16) and specific volume (column 21).

Column 26 calculates the total internal energy of the steam by multiplying the specific internal energy (column 25) by the mass (column 24).

Column 27 reports the entropy of the steam, as found from the 'Steam Tables' [J. H. Keenan, F. G. Keyes, P. G. Hill, and J. G. Moon, *Steam Tables*, (Wiley, New York, 1969).], as a function of temperature (column 16) and specific volume (column 21).

Column 28 calculates the specific volume of the steam after its adiabatic expansion in the entire piston by dividing the total piston volume (column 13+column 14) by the mass of steam in piston (column 24).

Column 29 gives the temperature of the steam after its adiabatic expansion in the entire piston, as found from the 'Steam Tables' [J. H. Keenan, F. G. Keyes, P. G. Hill, and J. G. Moon, *Steam Tables*, (Wiley, New York, 1969).], as a function of entropy (column 27) and specific volume (column 28).

Column 30 gives the steam pressure after its adiabatic expansion in the entire piston, as found from the 'Steam Tables' [J. H. Keenan, F. G. Keyes, P. G. Hill, and J. G. Moon, *Steam Tables*, (Wiley, New York, 1969).], as a function of entropy (column 27) and specific volume (column 28).

Column 31 gives the internal energy of the steam after its adiabatic expansion in the entire piston, as found from the 'Steam Tables' [J. H. Keenan, F. G. Keyes, P. G. Hill, and J. G. Moon, *Steam Tables*, (Wiley, New York, 1969).], as a function of entropy (column 27) and specific volume (column 28).

Column 32 calculates the total internal energy of the steam by multiplying the specific internal energy (column 31) by the mass (column 24).

Column 33 calculates the work done during the adiabatic expansion of the steam in the cylinder. This work equals the difference between the steam total internal energy before (column 26) and after (column 32) the adiabatic expansion.

Column 34 calculates the total work done by the steam during the isothermal expansion and the following adiabatic expansion. This total work is obtained by adding the numbers in columns 23 and 33.

Column 35 calculates the specific volume of the steam in the piston and condenser, after the adiabatic expansion in the condenser. It is assumed that the steam will expand from the piston to the condenser (which is considered to be evacuated at the beginning) as soon as the valve is opened, until the pressure is equal everywhere. The calculation is done by adding the volume of the piston (column 9) to that of the expansion chamber (column 12), and dividing by the mass of steam in the piston (column 24).

Column 36 reports the internal energy of the steam after the expansion in the condenser. Since the expansion is adiabatic, this internal energy is found from the 'Steam Tables' [J. H. Keenan, F. G. Keyes, P. G. Hill, and J. G. Moon, *Steam Tables*, (Wiley, New York, 1969).], as a function of entropy (column 27) and new specific volume (column 35).

Column 37 calculates the total internal energy of the steam in the case of no steam transfer to the boiler by multiplying the specific internal energy (column 36) by the mass (column 24).

Column 38 calculates the total internal energy of the steam, when some of the steam is transferred to the boiler, by multiplying the specific internal energy (column 36) by the mass (column 24).

Column 39 gives the temperature of the steam after its adiabatic expansion in the condenser, as found from the 'Steam Tables' [J. H. Keenan, F. G. Keyes, P. G. Hill, and J. G. Moon, *Steam Tables*, (Wiley, New York, 1969).], as a function of entropy (column 27) and specific volume (column 35).

Column 40 gives the pressure of the steam after its adiabatic expansion in the condenser, as found from the 'Steam Tables' [J. H. Keenan, F. G. Keyes, P. G. Hill, and J. G. Moon, *Steam Tables*, (Wiley, New York, 1969).], as a function of entropy (column 27) and specific volume (column 35).

Column 41 gives the specific volume of the steam, after being compressed by the piston in the condenser. This specific volume is obtained by dividing column 12 by column 24.

Column 42 gives the temperature of the steam after its compression in the condenser, as found from the 'Steam Tables' [J. H. Keenan, F. G. Keyes, P. G. Hill, and J. G. Moon, *Steam Tables*, (Wiley, New York, 1969).], as a function of entropy (column 27) and specific volume (column 41).

Column 43 gives the pressure of the steam after its compression in the condenser, as found from the 'Steam Tables' [J. H. Keenan, F. G. Keyes, P. G. Hill, and J. G. Moon, *Steam Tables*, (Wiley, New York, 1969).], as a function of entropy (column 27) and specific volume (column 41), in case of no steam transfer to the boiler.

Column 50 reports the internal energy of the steam after its compression in the condenser. Since the compression is adiabatic, this internal energy is found from the 'Steam Tables' [J. H. Keenan, F. G. Keyes, P. G. Hill, and J. G. Moon, *Steam Tables*, (Wiley, New York, 1969).], as a function of entropy (column 27) and specific volume (column 41).

Column 51 calculates the total internal energy of the steam by multiplying its specific internal energy (column 50) by its mass (column 24).

Column 54 calculates the work done by the piston during the adiabatic compression of the steam in the condenser. This work equals the difference between the steam total internal energy after (column 51) and before (column 37) the adiabatic compression.

Column 55 calculates the net work done by the piston. This net work is obtained by subtracting the work of column 54 from the work of column 34.

Column 56 calculates the number of cycles of piston per second required for a 5,558 kJ/sec (=5.558 MJ/sec=5.558 MW) electric generator. This number of cycles per second is obtained by dividing 5,558 kJ/sec by the number in column 55.

Column 57 calculates the number of cycles of piston per minute required for a 5.558 MJ/sec (=5.558 MW) electric generator. This number of cycles per minute is obtained by multiplying by 60 the number in column 56.

Second Row

The second row of the Table contains the same data as the first, with the exception that, since we are now considering the second cycle of engine operation, we have to insert as initial condition in column 15 the pressure in the boiler found in the previous row 1 (see column 22), i.e., 58 bars.

The temperature of the steam remains always 400° C. The calculations then proceed as before, and one finds that the pressure in the boiler will be reduced to 56 bars (column 22) whereas in the condenser it will increase to 45 bars (column 43). This pressure is still not sufficient to activate the valve that allows transfer of steam from the condenser to the boiler. In the meantime, the engine runs and delivers 397.69 kJ of energy during the first cycle, and 200.45 kJ during the second cycle. The flow of steam can be adjusted by means of a throttle-valve and governor for example as described in [Robert H. Thurston, *A History of the Growth of the Steam Engine* (Kennikat Press, Port Washington, N.Y., 1939) pp. 114-115] to keep the number of engine revolutions per minute commensurate with an engine constant power output equal to 5.558 MW. The required revolutions per minute during the first cycle are 838.53, whereas they are 1663.62 during the second cycle.

Third Row

In this row, where the third cycle of the reciprocating engine is analyzed, we have to insert in column 15 the boiler pressure that was left over from the previous cycle, namely 56 bars (see column 22). The steam temperature remains 400° C. The calculations then proceed as before. One finds that the boiler pressure will be reduced to 54 bars (column 22) during this cycle, whereas in the condenser the pressure would increase to 74 bars (column 43), were it not relieved in the manner described below, and the steam temperature in the condenser would reach 450° C. (column 42). The other numbers relative to the unrelieved case are to be found in columns 35, 36, 37, and 41. When the pressure is relieved, the temperature reaches 410° C. (column 45), as will be shown shortly. Relief occurs in this way. Assuming that the one-way valve from the condenser to the boiler opens as soon as the condenser pressure is slightly higher than the boiler pressure (say, when the former is 56 bars), then steam from the condenser will flow into the boiler until the pressure almost equalizes on both sides of the valve, which then closes. Since we have an adiabatic expansion from the condenser into the boiler, and both entropy and pressure of the steam are known (see column 27 and 44, respectively), the 'Steam Tables' [J. H. Keenan, F. G. Keyes, P. G. Hill, and J. G. Moon, *Steam Tables*, (Wiley, New York, 1969).] provide us with the steam specific volume (column 46), temperature (column 45), and internal energy (column 52). With the steam specific volume given in column 46 and the volume of the condenser given in column 12, one can calculate the mass of steam left over in the condenser (column 48) after transfer of some steam to the boiler. Without such transfer the steam mass would be as given by column 47, which is the sum of the masses given in the first three rows of column 24. Column 49 gives the difference between the two masses, i.e., the mass of steam that has moved from the condenser to the boiler. Column 53 calculates the total internal energy of the steam in the condenser by multiplying the specific internal energy given by column 52 by the mass of steam left in the condenser (column 48). The remaining columns have the same meaning as in the first row, as follows:

Column 54 calculates the work done by the piston during the adiabatic compression of the steam in the condenser. This work equals the difference between the steam total internal energy after (column 53) and before (column 38) the adiabatic compression.

Column 55 calculates the net work done by the piston. This net work is obtained by subtracting the work of column 54 from the work of column 34.

Column 56 calculates the number of cycles of piston per second required for a 5,558 kJ/sec (=5.558 MJ/sec=5.558 MW) electric generator. This number of cycles per second is obtained by dividing 5,558 kJ/sec by the number in column 55.

Column 57 calculates the number of cycles of piston per minute required for a 5.558 MJ/sec (=5.558 MW) electric generator. This number of cycles per minute is obtained by multiplying by 60 the number in column 56.

Fourth Row

In this row, where the fourth cycle of the reciprocating engine is analyzed, we have to insert in column 15 the pressure that has been reached in the boiler after the transfer of steam from the condenser. This pressure should be the same as in the condenser, i.e., 56 bars. However, the valve will presumably close slightly before the exact equalization of the two pressures has been reached, say at 55 bars. The steam temperature remains always 400° C. The analysis then proceeds as before, and the net work done in the full cycle of piston run is 293.57 kJ. From this the number of cycles of piston per second, and per minute for a 5.558 MJ/sec (=5.558 MW) electric generator is calculated and reported in columns 56 and 57, respectively.

Fifth and Sixth Row

Now, the reciprocating engine has reached a steady-state regime, whereby the phases are replicated at each cycle. This regime is characterized by an engine that runs at ~1135 RPM delivering the power required to feed the fusion device.

Figure 25:
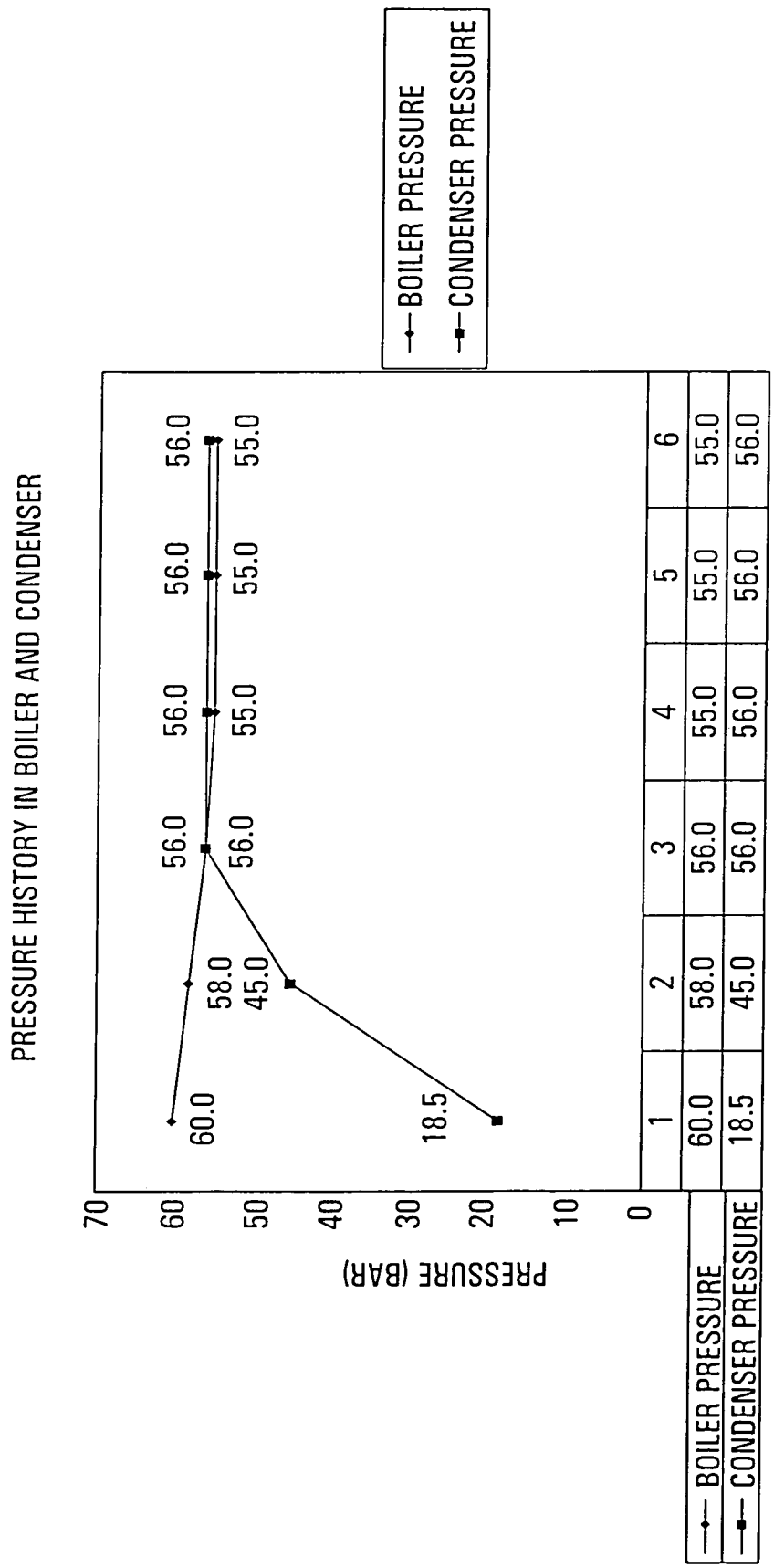
FIG. 25 shows a graph illustrating the pressure in the condenser and in the boiler as a function of cycles of the reciprocating engine of the fusion apparatus shown in FIGS. 23 and 24.

The graph at the end of the Table (FIG. 25) shows a summary of the results. For a few cycles, the pressure of the steam, both in the boiler and the condenser, has been plotted. One can see that, as the boiler's pressure goes down, the condenser's pressure goes up. At the time the valve is opened, and steam is realesed into the boiler. In subsequent cycles, the pressure in both boiler and condenser stabilizes, and the reactor can operate indefinitely.

Electric Circuit to Drive the Plasma Focus

Figure 26:
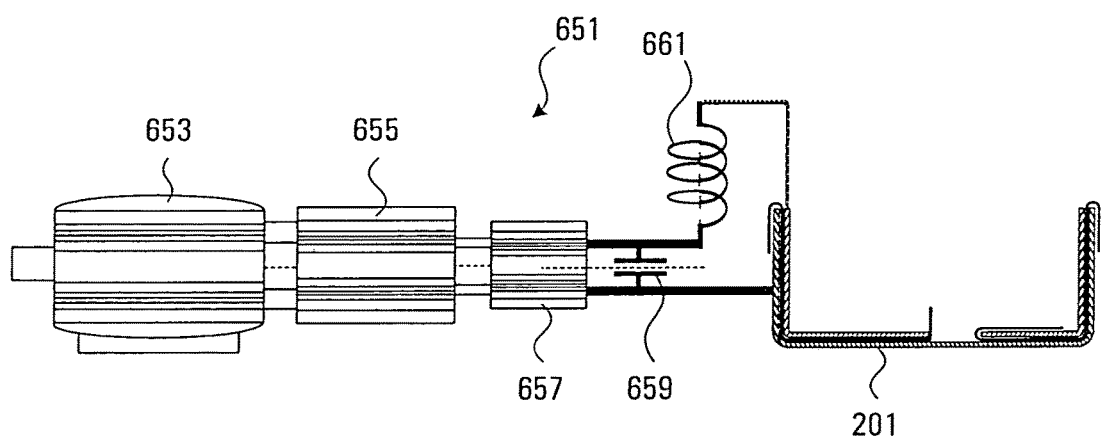
FIG. 26 shows a schematic diagram of an embodiment of a circuit for charging a capacitor for driving a fusion apparatus, in accordance with another aspect of the present invention.

An embodiment of an electric circuit for driving a plasma focus fusion device or another fusion device as shown in FIG. 26.

Referring to FIG. 26, the circuit 651 comprises an alternator 653 which may be arranged to be driven by an energy conversion unit from the energy produced by the fusion device, a transformer 655 coupled to the output of the alternator 653, a rectifier 657 coupled to the transformer 655 and a storage capacitor 659 coupled to the output of the rectifier 657. The condenser 201 for storing the energy required to drive the plasma focus is coupled to the output of the storage capacitor 659 through an inductor 661. The circuit may be arranged to generate a charging voltage for charging the condenser 201 of any suitable value. For example, in the embodiment described above, in order to store sufficient energy in the condenser 201, the condenser has to be charged to a voltage of about 100 kilovolts as the condenser is relatively compact. However, for larger condenser the charging voltage may be less.

The transformer 655 comprises a step-up transformer which converts the input voltage from the generator to the required charging voltage. The rectifier 657 and the storage capacitor 659 provide voltage regulation. The inductor 661 provides an isolating element between the output of the storage capacitor and the load, i.e. the condenser 201 to provide inductive or resonant charging. In an alternative embodiment, the inductance 661 could be replaced by a resistor acting as an isolating element. However, in resistive charging, the resistance can dissipate up to 50% of the total electrical energy used in the circuit and the voltage to which the capacitor is charged is the same of that as the power supply which must therefore be able to supply the voltage required. Advantageously, in inductive charging, the inductance is essentially non-dissipative. When an inductor is used to charge a capacitor from a constant voltage source, the voltage across the capacitance has the form of a damped oscillation, whose first maximum is approximately equal to twice the supply voltage if the initial voltage across the capacitance and the current through the inductance are zero.

The maximum occurs at a time equal to $\pi\sqrt{LC}$ after the voltage source is connected to the inductance-capacitance combination. The inductance to be used with a given network is, therefore, calculated by setting the interpulse interval equal to $\pi\sqrt{LC}$, where C is the network capacitance.

With careful design of the inductance, the efficiency of the charging circuit is as high as 90 to 95 percent, and the power-supply voltage needs to be only slightly greater than one half of the desired network voltage, resulting in a great advantage over resistance charging. A factor of 1.9 to 1.95 between network and supply voltage can be obtained if the charging inductance is designed so that the quality factor Q of the charging circuit is high."

For the embodiment described above, in order to obtain a charging frequency of 55.58 kHz, as required by one embodiment of the Plasma Focus fusion device to reach breakeven, the inductance is calculated from the period of the resonant circuit (=1/55,580) as follows:

$$T=\pi\sqrt{L_{charg}C}=1/55,580=1.80\times10^{-5} \text{ sec}, \quad (22)$$

from which $$L_{charg}=T^2/\pi^2C=1.64\times10^{-3} H. \quad (23)$$

This inductance can be obtained with a coil of 36 turns, each circular loop having a radius of 25 cm, and wire diameter 1 cm. The formula used to calculate the inductance is: [The inductance formula for this coil geometry is provided on the web at: http://emclab.umr.edu/new-induct/circular.html]

$$L_{charg} = N^2 R \mu_o \mu_r \left[\ln\left(\frac{8R}{a}\right) - 2.0\right] \text{ nanohenries} \quad (24)$$

where N is the number of turns in the coil, R and a are the radius of the coil and the radius of the wire in meters, respectively, $\mu_o=1.2566\times10^{-6}$ henry/meter is the permeability of free space, and $\mu_r$ is the relative permeability for air, which is equal to 1.

The repetition frequency of the Plasma Focus circuit should be such that the plasma has time to quench before the formation of the next discharge. In the present embodiment, the plasma should have time to quench at a repetition frequency of 55.58 kilohertz.

When the condenser is discharged in the Plasma Focus, the discharge oscillation has the following period:

$$T=2\pi\sqrt{L_{disch}C} \quad (25)$$

where $L_{disch}$ is the inductance of the discharge circuit. This is made up of the inductance of the condenser (=19.45 nH) and the inductance of the circuit itself. The latter is a function of the geometry of the circuit. Usually, the overall circuit inductance in a Plasma Focus is ~50 nH. Hence:

$$T=2\pi\sqrt{50\cdot10^{-9}\times20\cdot10^{-9}}=1.99\cdot10^{-7} \text{ sec} \quad (26)$$

Assuming that there are ten current oscillations before the plasma is fully quenched, one has as duration of the discharge:

$$t=1.99\cdot10^{-6} \text{ sec}. \quad (27)$$

Therefore the discharge lasts ~2 □sec. allowing another 8 □sec to make sure that the plasma is fully recombined, the repetition frequency of the Plasma Focus circuit can be as high as ⅒ □sec=100 kHz. This is almost twice the repetition frequency of 55.58 kHz at which the Plasma Focus fusion device will be operating. Hence, this is a frequency that can safely be reached.

Example of Procedure for Reactor Start-Up

In order to bring the reactor to the operating regime for breakeven, it is necessary first to raise the water and steam temperature in the boiler to 400° C. In order to calculate the heat energy necessary and the time that it will it take to reach this temperature, one needs to proceed as follows.

In a closed system, such as the one of the boiler, the formula to be used is: [Gordon J. Van Wylen, and Richard Sonntag, *Fundamentals of Classical Thermodynamics* (John Wiley and Sons, Inc., New York, 1973), P. 96.]

$$\Delta KE+\Delta PE+\Delta U=Q_{input}-Q_{lost}-W \quad (28)$$

where $\Delta KE$ is the change in the amount of kinetic energy of the system, $\Delta PE$ is the change in the amount of gravitational potential energy, $\Delta U$ is the change in the amount of internal energy, $Q_{input}$ is the amount of heat energy transferred into the system during a certain time interval, $Q_{lost}$ is the amount of heat energy lost from the system during that same time interval, and W is in net amount of work done by the system.

In this analysis, $\Delta KE$, $\Delta PE$, $Q_{lost}$ and W are assumed to be zero for obvious reasons. We are then left with:

$$Q=\Delta U, \quad (29)$$

which can be written as:

$$Q=M_{water}(u_{2water}-u_{1water})+M_{steam}(u_{2steam}-u_{1steam}), \quad (30)$$

where $M_{water}$ is the total mass of water in the boiler, $u_{2water}$ and $u_{1water}$ are the specific internal energies of the water at final state (400° C.), and initial state (20° C.), respectively, $M_{steam}$ is the mass of steam, and $u_{2steam}$ and $u_{1steam}$ are the specific internal energies of the steam at final state (400° C.), and initial state (20° C.), respectively. The mass of water in the closed system is given by:

$$M_{water}=(V/v) \quad (31)$$

where V is the volume occupied by the water, and v is its specific volume.

The volume V occupied by the water is considered to be the entire central spherical volume of the boiler, although the fusion apparatus occupies part of that volume. In other words, we are considering for heating more water than we really have to. The volume of water is (see column 2 of Table 3):

$$V=0.66 \text{ m}^3. \quad (32)$$

The density of water is 1000 kg/m³. The specific volume is the inverse of this number, i.e., 0.001 m³/kg. Hence, the mass of water is $M_{water}=660$ kg. The water at temperature 400° C. is beyond its critical temperature $T_{crit}=374.14°$ C., and therefore it is in the form of superheated steam. Although in this form, its specific density remains the same as originally at 20° C. because the water is confined in the containing vessel. The pressure, however, increases at this temperature. In order to find the water pressure at 400° C. and liquid density=1000 kg/m³, Table 4 reports data taken from the 'Steam Tables' [J. H. Keenan, F. G. Keyes, P. G. Hill, and J. G. Moon, *Steam Tables*, (Wiley, New York, 1969).] on the specific volume and specific internal energy of superheated steam at 400° C.

Figure 27:
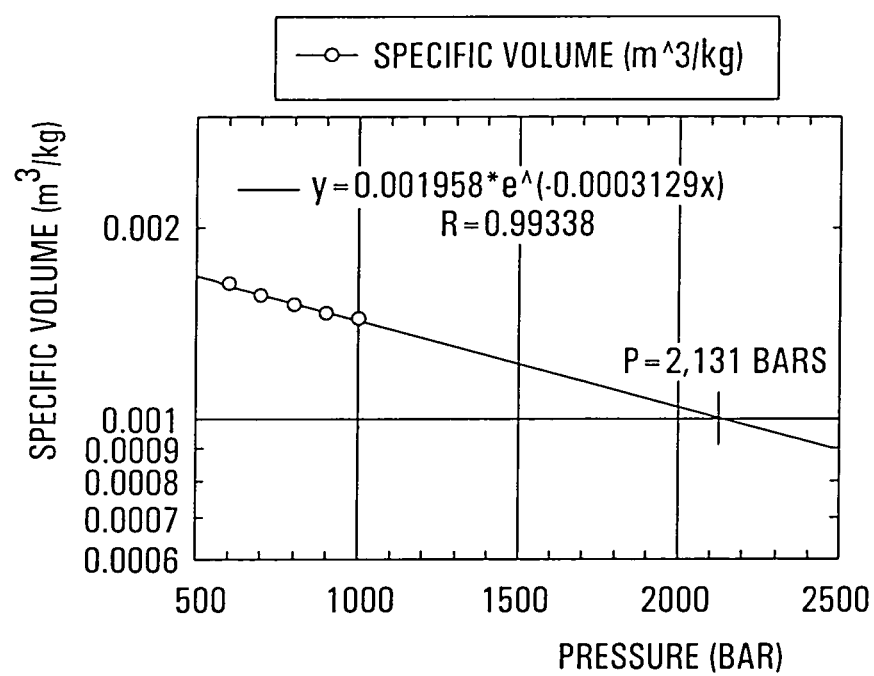
FIG. 27 shows a graph used to find the pressure corresponding to the specific volume of superheated steam at the density of water and a temperature of 400° C.
Figure 28:
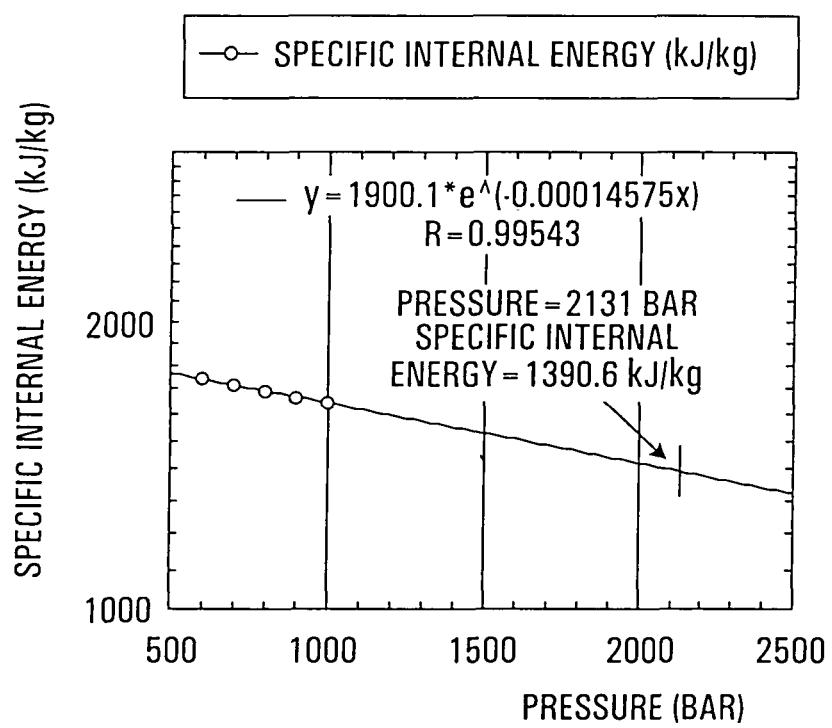
FIG. 28 shows a graph used to find the specific internal energy corresponding to the pressure P=to 2131 bars of superheated steam at the density of water and at a temperature of 400° C.

In FIG. 27 data is plotted taken from Table 4, i.e., specific volume vs. pressure, and, by exponential curve fitting, extrapolated the data up to the point where the specific density coincides with the water liquid density (=0.001 m³/kg). At this point, the pressure is 2,131 bars. This means that the superheated steam at 400° C. confined in the same volume as the one it had when it was at 20° C. has a pressure of 2,131 bars. The extrapolation equation appears on top of the graph, where the Linear Correlation Coefficient R is also displayed. This coefficient represents the relationship between the X and Y data to indicate how well the calculated curve fits the data. [KaleidaGraph—Data Analysis/Graphing Application (Synergy Software, Reading, Pa.) p. 295.] The procedure is repeated in FIG. 28 for the specific internal energy data vs. pressure, and found that the internal energy corresponding to 2,131 bars is 1,390.6 kJ/kg. This is the value that we will use in the formula above to determine $u_{2water}$.

It remains to find the value of $u_{1water}$, i.e., the specific internal energy of water at 20° C. But this is easily found from the properties of water [Jesse S. Doolittle, and Francis J. Hale, *Thermodynamics for Engineers* (John Wiley & Sons, New York, 1983), p. 559.], i.e., from the specific heat of water at 20° C. This specific heat is 4.182 kJ/kg ° K. Hence:

$$u_{1water}=4.182 \text{ kJ/kg·° K} \times 293° \text{ K}=1,225.33 \text{ kJ/kg} \quad (33)$$

As to $M_{steam}$, $u_{2steam}$, and $u_{1steam}$, the first is given in column 19 of Table 3. It is:

$$M_{steam}=26.43 \text{ kg}.$$

At the beginning, this steam is in the form of water at 20° C., and its specific internal energy is the same as in (33). Hence:

$$u_{1steam}=1,225.33 \text{ kJ/kg}. \quad (34)$$

The final specific internal energy at 400° C. and 60 bars pressure (see column 15 of Table 3) is found from the "Steam Tables": [J. H. Keenan, F. G. Keyes, P. G. Hill, and J. G. Moon, *Steam Tables*, (Wiley, New York, 1969).]

$$u_{2steam}=2,892.9 \text{ kJ/kg}. \quad (34)$$

The total amount of heat energy required to bring both the water and the steam in the boiler to a temperature of 400° C. can now be determined. Using (30):

$$Q=660 \quad (1,390.6-1,225.33)+26.43 \quad (2,892.9-1,225.33)=1.532 \times 10^5 \text{ kJ} \quad (35)$$

In order to find how long it will take to deposit this heat energy in the boiler, we write:

$$Q=W \times t \quad (36)$$

where W is the rate of heat addition and t is the time. Table 4 reports the results. It shows that the boiler can be brought to the operating regime within a time that ranges from less than an hour to more than two hours, depending on rate of heat deposition.

Modifications to the embodiments described above will be apparent to those skilled in the art.

REFERENCES

1. E. Panarella, "Analysis of the Fusion Breakeven Conditions for D-T Plasmas of Prescribed Temperature Evolution" in *Current Trends in International Fusion Research—Proceedings of the 1st Symposium* (ed. E. Panarella, Plenum Press, New York, 1997) p. 211.
2. J. S. Brzosko, J. H. Degnan, N. V. Filippov, B. L. Freeman, G. F. Kiutlu, and J. W. Mather, "Comments on the Feasibility of Achieving Scientific Breakeven with a Plasma Focus Machine" in *Current Trends in International Fusion Research—Proceedings of the 1st Symposium* (ed. E. Panarella, Plenum Press, New York, 1997) p. 11.
3. A. Shyam, and M. Srinivasam, Neutron Emission from a 100 Joule Plasma. *Appl. Physics* 17, 425 (1978).
4. NRL Plasma Formulary (revised 1978), p. 37.
5. Francesco Pegoraro. "Ignition Physics and the Ignitor Project" in *Current Trends in International Fusion Research—Proceedings of the 1st Symposium* (ed. E. Panarella, Plenum Press, New York, 1997) p. 125.
6. Andrew M. Sessler, Thomas H. Stix, and Marshall N. Rosenbluth, "Build the International Thermonuclear Experimental Reactor?", *Physics Today*, June 1996, p. 21, and references therein.
7. Charles D. Orth, "Prospects for Inertial Fusion Energy Based on a Diode-Pumped Solid-State Laser (DPSSL) Driver: Overview and Development Path" in *Current Trends in International Fusion Research—Proceedings of the 2nd Symposium* (ed. E. Panarella, NRC Research Press, Ottawa, 1999) p. 241.
8. J. P. Holman. Heat Transfer (McGraw-Hill, New York 1981), p. 10.
9. Spruce Pine Mica Company, Spruce Pine, N.C., U.S.A. -Internet address: http://spruce-pine-mica.com/properti.htm.
10. The inductance formula for our capacitor geometry is provided on the web at: http://emclab.umr.edu/new-induct/trace-v.html.
11. R. A. Hill and J. W. Hubbs. A Multi-Shot Dense Plasma Focus with Improved Cathode Design. *Phys. Lett.* 98A, 417 (1983).
12. E. Panarella, and V. Guty. A Kiloampere Current Diode Based on the Quenched Spark Gap Switch. *J. Physics E: Scientific Instruments* 7, 835 (1974).
13. R. W. Conn. First Wall and Divertor Plate Material Selection in Fusion Reactors. *J. of Nuclear Materials* 76 & 77, 103 (1978).
14. Leonard R. Ingersoll, Otto J. Zobel, and Alfred C. Ingersoll, *Heat Conduction* (McGraw-Hill Book Company, New York, 1948), p. 38.
15. *Encyclopaedia Britannica*, Vol. 14, p. 600.
16. *Smithsonian Physical Tables*, 1964, p. 393.
17. J. H. Keenan, F. G. Keyes, P. G. Hill, and J. G. Moon, *Steam Tables* (Wiley, New York, 1969).
18. Robert H. Thurston, A History of the Growth of the Steam Engine (Kennikat Press, Port Washington, N.Y., 1939), pp. 114-115.
19. John E. Traister, *Handbook of Power Generators: Transformers and Generators* (Prentice-Hall, Englewood Cliffs, N.J. 1983), p. 25.
20. G. N. Glasoe, and J. V. Labacqz, *Pulse Generators* (McGraw-Hill Book Company, Inc., 1948), pp. 12, 380.
21. The inductance formula for our coil geometry is provided on the web at: http://emclab.umr.edu/new-induct/circular.html.
22. Gordon J. Van Wylen, and Richard Sonntag, *Fundamentals of Classical Thermodynamics* (John Wiley and Sons, Inc., New York, 1973), p. 96.
23. *KaleidaGraph—Data Analysis/Graphing Application* (Synergy Software, Reading, Pa.) p. 295.
24. Jesse S. Doolittle, and Francis J. Hale, *Thermodynamics for Engineers* (John Wiley & Sons, New York, 1983), p. 559.

The invention claimed is:

1. A nuclear fusion system comprising:
   a nuclear fusion device,
     the nuclear fusion device being configured to provide heat energy;
   at least one capacitor,
     the at least one capacitor configured to store electrical energy which is usable by the nuclear fusion device in providing the heat energy;
   an electrically conductive member,
     the electrically conductive member being configured to carry electrical energy from the at least one capacitor to the nuclear fusion device;

a first chamber having a first chamber wall,
  each of the nuclear fusion device, the at least one capacitor, and the electrically conductive member being located within the first chamber and enclosed by the first chamber wall;
a second chamber defined by a second chamber wall,
  the first chamber being located within the second chamber,
  the second chamber containing a body of fluid therein,
    the fluid being located between the first chamber wall and the second chamber wall,
    the fluid surrounding the first chamber wall, the nuclear fusion device, the at least one capacitor, and the electrically conductive member, and
    the fluid being arranged to receive heat energy from each of the nuclear fusion device, the at least one capacitor, and the electrically conductive member, which would result in the fluid being a heated fluid;
a thermal energy converter,
  part of the converter being located within the first chamber,
  part of the converter being located within the second chamber,
  the converter being configured to receive heat energy from the heated fluid,
    the converter including a fluid inlet port located in the second chamber,
      the fluid inlet port being arranged to receive heated fluid,
  the converter comprising an electrical power generator,
    the generator being configured to convert at least some of the heat energy received by the converter into electrical energy, and
    the generator being coupled within the system to the at least one capacitor, which allows the generator to provide at least some of the electrical energy to the at least one capacitor; and
thermal super insulating material,
  the insulating material comprising layers of reflective material, each adjacent layer separated by at least one spacer, and wherein
  the insulating material encloses and surrounds the second chamber, to provide insulation between the heated fluid and the cooler ambient, to reduce heat loss from the heated fluid to the cooler ambient.

2. A nuclear fusion system as claimed in claim 1, wherein said nuclear fusion device comprises a switch for controlling said at least one capacitor to deliver electrical pulses to said nuclear fusion device for repetitive firing thereof.

3. A nuclear fusion system as claimed in claim 2, wherein said nuclear fusion device comprises a Plasma Focus-type nuclear fusion device.

4. A nuclear fusion system as claimed in claim 1,
  further including a valve configured to return fluid received from said second chamber and used by said converter, back to the second chamber.

5. A nuclear fusion system as claimed in claim 1, wherein the fluid in said second chamber comprises water.

6. A nuclear fusion system as claimed in claim 1, further comprising an inner chamber defined by an inner chamber wall, said inner chamber being disposed within said first chamber and said inner chamber wall enclosing said at least one capacitor, said electrically conductive member and said nuclear fusion device, and a neutron absorbing fluid between said first chamber and said inner wall.

7. A nuclear fusion system as claimed in claim 4, comprising a conduit, for returning said fluid from thermal said energy converter to said second chamber, and super insulating material surrounding said conduit.

8. A nuclear fusion system as claimed in claim 1, wherein said generator is positioned within said first chamber.

9. A nuclear fusion system comprising:
a nuclear fusion device,
  the nuclear fusion device being configured to provide heat energy;
at least one capacitor,
  the at least one capacitor configured to store electrical energy which is usable by the nuclear fusion device in providing the heat energy;
an electrically conductive member,
  the electrically conductive member being configured to carry electrical energy from the at least one capacitor to the nuclear fusion device;
a first chamber having a first chamber wall,
  each of the nuclear fusion device, the at least one capacitor, and the electrically conductive member being located within the first chamber and enclosed by the first chamber wall;
a second chamber defined by a second chamber wall,
  the first chamber being located within the second chamber,
  the second chamber containing a body of fluid therein,
    the fluid being located between the first chamber wall and the second chamber wall,
    the fluid surrounding the first chamber wall, the nuclear fusion device, the at least one capacitor, and the electrically conductive member, and
    the fluid being arranged to receive heat energy from each of the nuclear fusion device, the at least one capacitor, and the electrically conductive member, which would result in the fluid being a heated fluid;
a thermal energy converter,
  the converter being configured to receive heat energy from the heated fluid,
    the converter including a fluid inlet port in communication with the second chamber,
      the fluid inlet port being arranged to receive heated fluid,
  the converter comprising an electrical power generator,
    the generator being configured to convert at least some of the heat energy received by the converter into electrical energy, and
    the generator being coupled within the system to the at least one capacitor, which allows the generator to provide at least some of the electrical energy to the at least one capacitor; and
thermal super insulating material,
  the insulating material comprising layers of reflective material, each adjacent layer separated by at least one spacer, and wherein
  the insulating material encloses and surrounds the second chamber, to provide insulation between the heated fluid and the cooler ambient, to reduce heat loss from the heated fluid to the cooler ambient, and
  the insulating material encloses and surrounds at least part of the thermal energy converter to provide insulation between the at least part of the thermal energy converter and the cooler ambient, to reduce heat loss from the heated fluid to the cooler ambient.

* * * * *